(12) United States Patent
Zhou

(10) Patent No.: US 11,691,634 B1
(45) Date of Patent: Jul. 4, 2023

(54) ON-VEHICLE DRIVING BEHAVIOR MODELLING

(71) Applicant: PlusAI, Inc., Cupertino, CA (US)

(72) Inventor: Mianwei Zhou, Cupertino, CA (US)

(73) Assignee: Plus AI, Inc., Santa Clara, CA (US)

(*) Notice: Subject to any disclaimer, the term of this patent is extended or adjusted under 35 U.S.C. 154(b) by 0 days.

(21) Appl. No.: 17/849,588

(22) Filed: Jun. 24, 2022

(51) Int. Cl.
*B60W 50/00* (2006.01)
*G05B 13/02* (2006.01)
*G07C 5/08* (2006.01)

(52) U.S. Cl.
CPC ....... *B60W 50/0097* (2013.01); *G05B 13/027* (2013.01); *G07C 5/085* (2013.01); *B60W 2050/0022* (2013.01); *B60W 2050/0028* (2013.01); *B60W 2050/0083* (2013.01); *B60W 2420/40* (2013.01); *B60W 2420/42* (2013.01); *B60W 2420/52* (2013.01); *B60W 2420/54* (2013.01); *B60W 2552/50* (2020.02); *B60W 2552/53* (2020.02); *B60W 2554/20* (2020.02); *B60W 2554/4026* (2020.02); *B60W 2554/4029* (2020.02); *B60W 2554/4046* (2020.02); *B60W 2555/60* (2020.02)

(58) Field of Classification Search
None
See application file for complete search history.

(56) References Cited

U.S. PATENT DOCUMENTS

| | | | |
|---|---|---|---|
| 2019/0236955 A1* | 8/2019 | Hu | G05D 1/0212 |
| 2019/0382030 A1* | 12/2019 | Hotson | B60W 30/02 |
| 2021/0139048 A1* | 5/2021 | Russell | G08G 1/166 |
| 2021/0191407 A1* | 6/2021 | Benisch | B60W 60/001 |
| 2021/0197848 A1* | 7/2021 | Kilaru | B60W 50/0097 |
| 2021/0206387 A1* | 7/2021 | Brahma | B60W 50/10 |
| 2021/0357662 A1* | 11/2021 | Hartmann | G05D 1/0221 |
| 2022/0126818 A1* | 4/2022 | Marcotte | G06N 20/00 |
| 2022/0135029 A1* | 5/2022 | Poubel Orenstein | B60W 30/0956 701/301 |
| 2022/0166461 A1* | 5/2022 | Sun | H04B 3/493 |
| 2022/0253304 A1* | 8/2022 | Tamachi | B60W 50/04 |

* cited by examiner

*Primary Examiner* — David P. Merlino
(74) *Attorney, Agent, or Firm* — Morgan, Lewis & Bockius LLP

(57) ABSTRACT

This application is directed to on-vehicle behavior modeling of vehicles. A vehicle has one or more processors, memory, a plurality of sensors, and a vehicle control system. The vehicle collects training data via the plurality of sensors, and the training data include data for one or more vehicles during a collection period. The vehicle locally applies machine learning to train a vehicle driving behavior model using the collected training data. The vehicle driving behavior model is configured to predict a behavior of one or more vehicles. The vehicle subsequently collecting sensor data from the plurality of sensors and drives the vehicle by applying the vehicle driving behavior model to predict vehicle behavior based on the collected sensor data. The vehicle driving behavior model is configured to predict behavior of an ego vehicle and/or a distinct vehicle that appears near the ego vehicle.

20 Claims, 13 Drawing Sheets

900

At a first vehicle having one or more processors, memory, a plurality of sensors, and a control system 902

The plurality of sensors include one or more of: GPS, a LiDAR scanner, one or more cameras, a RADAR sensor, an infrared sensor, one or more ultrasonic sensors, a DSRC module, an INS, and an odometry sensor 904

Collect training data via the plurality of sensors, the training data including data for one or more vehicles during a collection period 906

> The one or more vehicles include one or more second vehicles near the first vehicle during the collection period 924

> The plurality of sensors includes at least a light detection and ranging (LiDAR) scanner and an inertial navigation system (INS) including accelerometers and gyroscopes 926

> The training data includes relative positions that are measured between the first vehicle and the one or more second vehicles by the LiDAR scanner and relative motions measured between the first vehicle and the one or more second vehicles by the INS during the collection period 928

> Collect data for road objects that appear on a road and in measurement ranges of the plurality of sensors, the road objects including one or more of: lane lines, shoulder lines, road dividers, traffic lights, traffic signs, road signs, cones, a pedestrian, a bicycle, and a driver of the first vehicle, wherein the data for road objects is applied to train one or more vehicle models 930

Locally at the first vehicle, use machine learning to train a vehicle driving behavior model using the collected training data, wherein the vehicle driving behavior model is configured to predict a behavior of one or more vehicles 908

> The vehicle driving behavior model is trained using unused on-vehicle processing capabilities of the first vehicle, while the first vehicle is charging, driving, or parked 910

> The plurality of sensors include a camera, and the collected training data includes a plurality of images captured by the camera 932

> The one or more vehicles include a plurality of second vehicles that are near the first vehicle and correspond to a plurality of vehicle types 934

> The vehicle driving model is trained using the plurality of images to predict behavior of the plurality of second vehicles based on the plurality of vehicle types 936

```
Locally at the first vehicle, use machine learning to train a vehicle driving
behavior model using the collected training data, wherein the vehicle driving
behavior model is configured to predict a behavior of one or more vehicles 908

(A)

The collected training data includes a first set of training data captured
    during a first duration of time and a second set of training data captured
    during a second duration of time following the first duration of time 938

Determine the behavior of the one or more vehicles from the first
        set of training data using the vehicle driving behavior model 940

Compare the behavior of the one or more vehicles with the
        second set of training data 942

Modify one or more weights of a neural network of the vehicle
        driving behavior model based on a comparison result 944

↓
Subsequently collect sensor data from the plurality of sensors 912
                                     ↓
At least partially autonomously driving the vehicle by applying the vehicle
driving behavior model to predict vehicle behavior based on the collected
sensor data 914

The one or more vehicles include the first vehicle, and the collected
    training data includes data for the first vehicle 916

Apply the vehicle driving behavior model to the collected sensor
        data to predict vehicle behavior of the first vehicle 918

The one or more vehicles include a plurality of second vehicles that are
    near the first vehicle, and the collected training data includes data for the
    plurality of second vehicles 920

Apply the vehicle driving behavior model to the vehicle driving
        behavior model to the collected sensor data to predict vehicle
        behavior of the third vehicle 922

The vehicle driving behavior model is trained, before the sensor data are collected from the plurality of sensors and the vehicle driving behavior model is used to predict the vehicle behavior 946

The sensor data are added to the training data to iteratively train the vehicle driving behavior model, after applying the vehicle driving behavior model to predict the vehicle behavior 948

The vehicle driving behavior model includes a first vehicle driving behavior model, and the first vehicle driving behavior model is trained using the collected training data to generate a second vehicle driving behavior model, concurrently when the first vehicle driving behavior model is0used to predict the vehicle behavior from the collected sensor data 950

Add the collected sensor data to the collected training data 952

The collected sensor data including first sensor data 954

Collect second sensor data from the plurality of sensors after collecting the first sensor data 956

While continuing to train the second vehicle driving behavior model with the training data added with the first sensor data, apply the second vehicle driving behavior model to predict the vehicle behavior based on the second sensor data 958

A vehicle control model is used together with the vehicle driving behavior model to at least partially autonomously drive the vehicle 960

In accordance with a determination that the first vehicle operates in an at least partial autonomous driving mode 962

Provide the predicted vehicle behavior to the vehicle control model 964

Based on the predicted vehicle behavior, applying the vehicle control model to generate a vehicle control instruction for controlling the first vehicle 966

Provide the vehicle driving behavior model that is trained using the collected training data to a server, wherein the server is communicatively coupled to the first vehicle via one or more communication networks 968

The server is configured to consolidate a plurality of driving behavior models provided by a plurality of vehicles, generate a comprehensive driving behavior model, and provide the comprehensive driving behavior model to one or more target vehicles 970

The first vehicle has a plurality of vehicle parameters, and each of the plurality of sensors and the control system operates according to a respective vehicle parameter 972

The vehicle driving behavior model is coupled to a vehicle adjustment module that is configured to determine the plurality of vehicle parameters 974

Provide the predicted vehicle behavior to the vehicle adjustment module 976

Update by the vehicle adjustment module the plurality of vehicle parameters based on the predicted vehicle behavior 978

Generate a vehicle adjustment instruction based on the plurality of vehicle parameters that are updated 980

Figure 9D

ON-VEHICLE DRIVING BEHAVIOR MODELLING

TECHNICAL FIELD

The present application generally relates to vehicle technology, and more particularly to, computer-aided methods and systems for at least partial autonomous vehicle control.

BACKGROUND

Vehicles are now capable of self-driving with different levels of autonomy. Each of these levels is characterized by the amount of human and autonomous control. For example, The Society of Automotive Engineers (SAE) defines 6 levels of driving automation ranging from 0 (fully manual) to 5 (fully autonomous). These levels have been adopted by the U.S. Department of Transportation.

There are numerous advantages of autonomous vehicles, including: (1) lowering the number of vehicles on the roads (most privately owned vehicles are driven a small fraction of the time); (2) more predictable and safer driving behavior than human driven vehicles; (3) less emissions if more vehicles are electrically powered; (4) improved fuel efficiency; (5) increased lane capacity; (6) shorter travel times; and (7) mobility for users who are incapable of diving. One of the key obstacles facing the autonomous vehicle industry, however, is the complexity and unpredictability of road and traffic conditions. This makes it difficult to train autonomous vehicles for every possible rare condition or event that the vehicle may encounter while driving (so-called "edge" cases). For example, occasionally, human drivers may need to react to extraordinary or rare events, like a package falling off of a truck, a lane closure, or something even more rare, such as an aircraft making an emergency landing on the freeway. In these rare situations, human drivers are usually able to react instinctively to avoid harm to themselves and their vehicles. However, unless an autonomous driving model has been trained for each such rare event, the vehicle may not know how to react.

To capture and learn from existing road and traffic conditions, fleet operators often collect large amounts of data from individual vehicles. This data is regularly sent from the vehicles to a remote server and later analyzed. Transmitting such large amounts of data (e.g., HD video or LIDAR data) from many vehicles (e.g., over a cellular data network) consumes valuable communication bandwidth and is prohibitively expensive. Therefore, it is desirable to provide a more efficient mechanism for collecting, monitoring, and learning from road condition data captured by a fleet of vehicles.

SUMMARY

This application is directed to local vehicle behavior modelling, where a vehicle uses locally recorded training data from the vehicle sensors to train a vehicle driving behavior model. The training data may be captured for the particular driver of the vehicle, the particular vehicle itself, or surrounding vehicles. The vehicle driving behavior model is then applied to predict vehicle driving behavior based on sensor data collected in real-time, to drive the vehicle at least partially autonomously. In some embodiments, the vehicle driving behavior model is trained using unused computational resources of the vehicle, either while the vehicle is driving or when the vehicle is stationary. In some embodiments, the vehicle driving behavior model is applied locally at the vehicle. In some embodiments, the vehicle driving behavior model is uploaded to a server, either periodically or upon request. In some embodiments, the server uses one or more vehicle driving behavior models collected from one or more vehicles to generate an aggregated vehicle driving behavior model that can be transmitted to one or more of the vehicles. In some other embodiments, the one or more vehicle driving behavior models are used to simulate different road and driving scenarios, and once distributed to individual vehicles, simulation results improve the robustness of autonomous driving capabilities of the individual vehicles. Additionally, in some embodiments, only the individual vehicle driving behavior models are uploaded to the server and not the underlying recorded training data, thereby conserving communication bandwidth.

In some embodiments, a method is implemented at a first vehicle for on-vehicle behavior modeling of vehicles. The first vehicle has one or more processors, memory, a plurality of sensors, and a vehicle control system (e.g., including a plurality of actuators). The method includes collecting training data via the plurality of sensors, and the training data includes data for one or more vehicles during a collection period. The method further includes, locally at the first vehicle, using machine learning to train a vehicle driving behavior model using the collected training data. The vehicle driving behavior model is configured to predict a behavior of one or more vehicles. The method further includes subsequently collecting sensor data from the plurality of sensors and at least partially autonomously driving the vehicle by applying the vehicle driving behavior model to predict vehicle behavior based on the collected sensor data.

According to another aspect of the present application, a computer system includes one or more processing units and memory having a plurality of programs stored in the memory. The programs, when executed by the one or more processing units, cause the vehicle to perform any of the methods for augmenting training data and facilitating vehicle driving as described above.

According to another aspect of the present application, a non-transitory computer readable storage medium stores a plurality of programs configured for execution by a computer system having one or more processing units. The programs, when executed by the one or more processing units, cause the computer system to perform any of the methods for augmenting training data and facilitating vehicle driving as described above.

On-vehicle behavior modeling takes advantage of unused computational capabilities of distributed individual vehicles and requires only a small amount of data (i.e., a vehicle driving behavior model) be transferred out of individual vehicles. Original vehicle data can be kept locally in individual vehicles without using a communication bandwidth or breaching data privacy of each individual vehicle. As the vehicle driving behavior model is provided to a server periodically to update the same model on a system level, the entire system including many other vehicles coupled to the server can benefit from the updated vehicle driving behavior model and operate with an improved robustness level.

BRIEF DESCRIPTION OF DRAWINGS

The accompanying drawings, which are included to provide a further understanding of the embodiments and are incorporated herein and constitute a part of the specification, illustrate the described embodiments and together with the description serve to explain the underlying principles.

FIGS. 9A-9D is a flow diagram of an example method for on-vehicle behavior modeling of vehicles, in accordance with some embodiments.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Various embodiments of this application are directed to on-vehicle behavior modeling of vehicles. A vehicle collects training data including data for one or more vehicles during a collection period. The training data includes sensor data collected by a plurality of sensors of the vehicle and/or vehicle control data received by a vehicle control system of the vehicle. The training data is used locally by a machine learning system of the vehicle to train a vehicle driving behavior model. The vehicle driving behavior model is configured to predict a behavior of the vehicle itself or adjacent vehicles that are near the vehicle. While additional sensor data is collected from the plurality of sensors, the vehicle driving behavior model is applied to process the additional sensor data and predict vehicle behavior of the vehicle itself or adjacent vehicles, thereby facilitating at least partially autonomously driving the vehicle. The vehicle behavior predicted by the vehicle driving behavior model may be used by the vehicle directly to generate a vehicle control instruction to drive the vehicle or adjust one or more vehicle parameters of the sensors or control system of the vehicle. Alternatively, the vehicle driving behavior model may be provided to a server via one or more communication networks and further processed by the server. The processed vehicle driving behavior model is returned to the vehicle or provided to one or more other vehicles.

Figure 1:
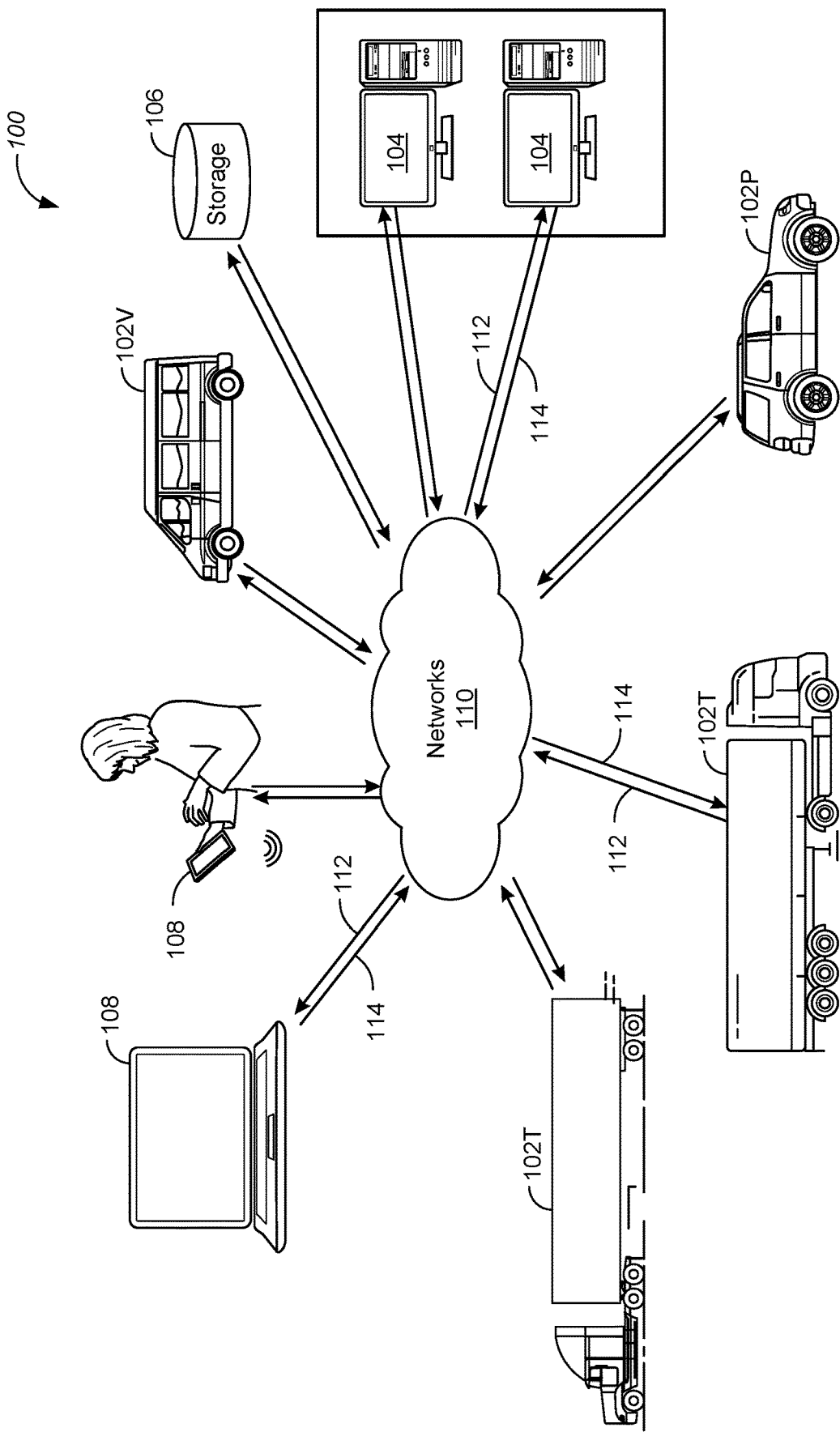
FIG. 1 is an example vehicle driving environment for a plurality of vehicles, in accordance with some embodiments.

FIG. 1 is an example vehicle driving environment 100 having a plurality of vehicles 102 (e.g., vehicles 102P, 102T, and 102V), in accordance with some embodiments. Each vehicle 102 has one or more processors, memory, a plurality of sensors, and a vehicle control system. The vehicle control system is configured to sense the vehicle driving environment 100 and drive on roads having different road conditions. The plurality of vehicles 102 may include passenger cars 102P (e.g., sport-utility vehicles and sedans), vans 102V, trucks 102T, and driver-less cars. Each vehicle 102 can collect sensor data and/or user inputs, execute user applications, present outputs on its user interface, and/or operate the vehicle control system to drive the vehicle 102. The collected data or user inputs can be processed locally (e.g., for training and/or for prediction) at the vehicle 102 and/or remotely by one or more servers 104. The one or more servers 104 provide system data (e.g., boot files, operating system images, and user applications) to the vehicle 102, and in some embodiments, process the data and user inputs received from the vehicle 102 when the user applications are executed on the vehicle 102. In some embodiments, the vehicle driving environment 100 further includes storage 106 for storing data related to the vehicles 102, servers 104, and applications executed on the vehicles 102.

For each vehicle 102, the plurality of sensors includes one or more of: (1) a global positioning system (GPS) sensors; (2) a light detection and ranging (LiDAR) scanner; (3) one or more cameras; (4) a radio detection and ranging (RADAR) sensor; (5) an infrared sensor; (6) one or more ultrasonic sensors; (7) a dedicated short-range communication (DSRC) module; (8) an inertial navigation system (INS) including accelerometers and gyroscopes; and/or (9) an odometry sensor. The cameras are configured to capture a plurality of images in the vehicle driving environment 100, and the plurality of images are applied to map the vehicle driving environment 100 to a 3D vehicle space and identify a location of the vehicle 102 within the environment 100. The cameras also operate with one or more other sensors (e.g., GPS, LiDAR, RADAR, and/or INS) to localize the vehicle 102 in the 3D vehicle space. For example, the GPS identifies a geographical position (geolocation) of the vehicle 102 on the Earth, and the INS measures relative vehicle speeds and accelerations between the vehicle 102 and adjacent vehicles 102. The LiDAR scanner measures the distance between the vehicle 102 and adjacent vehicles 102 and other objects. Data collected by these sensors is used to determine vehicle locations determined from the plurality of images or to facilitate determining vehicle locations between two images.

The vehicle control system includes a plurality of actuators for at least steering, braking, controlling the throttle (e.g., accelerating, maintaining a constant velocity, or decelerating), and transmission control. Depending on the level of automation, each of the plurality of actuators (or manually controlling the vehicle, such as by turning the steering wheel) can be controlled manually by a driver of the vehicle, automatically by the one or more processors of the vehicle, or jointly by the driver and the processors. When the vehicle 102 controls the plurality of actuators independently or jointly with the driver, the vehicle 102 obtains the sensor data collected by the plurality of sensors, identifies adjacent road features in the vehicle driving environment 100, tracks the motion of the vehicle, tracks the relative distance between the vehicle and any surrounding vehicles or other objects, and generates vehicle control instructions to at least partially autonomously control driving of the vehicle 102. Conversely, in some embodiments, when the driver takes control of the vehicle, the driver manually provides vehicle control instructions via a steering wheel, a braking pedal, a throttle pedal, and/or a gear lever directly. In some embodiments, a vehicle user application is executed on the vehicle and configured to provide a user interface. The driver provides vehicle control instructions to control the plurality of actuators of the vehicle control system via the user interface of the vehicle user application. By these means, the vehicle 102 is configured to drive with its own vehicle control system and/or the driver of the vehicle 102 according to the level of autonomy.

In some embodiments, autonomous vehicles include, for example, a fully autonomous vehicle, a partially autonomous vehicle, a vehicle with driver assistance, or an autonomous capable vehicle. Capabilities of autonomous vehicles can be associated with a classification system, or taxonomy, having tiered levels of autonomy. A classification system can be specified, for example, by industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention) as classified by the International Society of Automotive Engineers (SAE International). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator or a remote operator. The autonomous vehicle may operate solely at a given level (e.g. level 2 additional assistance or level 5 full automation) for at least a period of time or during the entire operating time of the autonomous vehicle. Other classification systems can provide other levels of autonomy characterized by different vehicle capabilities.

In some embodiments, the vehicle 120 drives in the vehicle driving environment 100 at level 5. The vehicle 120 collects sensor data from the plurality of sensors, processes the sensor data to generate vehicle control instructions, and controls the vehicle control system to drive the vehicle autonomously in response to the vehicle control instructions. Alternatively, in some situations, the vehicle 120 drives in the vehicle driving environment 100 at level 0. The vehicle 120 collects the sensor data and processes the sensor data to provide feedback (e.g., a warning or an alert) to a driver of the vehicle 120 to allow the driver to drive the vehicle 120 manually and based on the driver's own judgement. Alternatively, in some situations, the vehicle 120 drives in the vehicle driving environment 100 partially autonomously at one of levels 1-4. The vehicle 120 collects the sensor data and processes the sensor data to generate a vehicle control instruction for a portion of the vehicle control system and/or provide feedback to a driver of the vehicle 120. The vehicle 102 is driven jointly by the vehicle control system of the vehicle 102 and the driver of the vehicle 102. In some embodiments, the vehicle control system and driver of the vehicle 102 control different portions of the vehicle 102. In some embodiments, the vehicle 102 determines the vehicle status. Based on the vehicle status, a vehicle control instruction of one of the vehicle control system or driver of the vehicle 102 preempts or overrides another vehicle control instruction provided by the other one of the vehicle control system or driver of the vehicle 102.

For the vehicle 102, the sensor data collected by the plurality of sensors, the vehicle control instructions applied to the vehicle control system, and the user inputs received via the vehicle user application form a collection of vehicle data 112. In some embodiments, at least a subset of the vehicle data 112 from each vehicle 102 is provided to one or more servers 104. A server 104 provides a central vehicle platform for collecting and analyzing the vehicle data 112, monitoring vehicle operation, detecting faults, providing driving solutions, and updating additional vehicle information 114 to individual vehicles 102 or client devices 108. In some embodiments, the server 104 manages vehicle data 112 of each individual vehicle 102 separately. In some embodiments, the server 104 consolidates vehicle data 112 from multiple vehicles 102 and manages the consolidated vehicle data jointly (e.g., the server 104 statistically aggregates the data).

Additionally, in some embodiments, the vehicle driving environment 100 further includes one or more client devices 108, such as desktop computers, laptop computers, tablet computers, and mobile phones. Each client device 108 is configured to execute a client user application associated with the central vehicle platform provided by the server 104. The client device 108 is logged into a user account on the client user application, and the user account is associated with one or more vehicles 102. The server 104 provides the collected vehicle data 112 and additional vehicle information 114 (e.g., vehicle operation information, fault information, or driving solution information) for the one or more associated vehicles 102 to the client device 108 using the user account of the client user application. In some embodiments, the client device 108 is located in the one or more vehicles 102, while in other embodiments, the client device is at a location distinct from the one or more associated vehicles 102. As such, the server 104 can apply its computational capability to manage the vehicle data and facilitate vehicle monitoring and control on different levels (e.g., for each individual vehicle, for a collection of vehicles, and/or for related client devices 108).

The plurality of vehicles 102, the one or more servers 104, and the one or more client devices 108 are communicatively coupled to each other via one or more communication networks 110, which is used to provide communications links between these vehicles and computers connected together within the vehicle driving environment 100. The one or more communication networks 110 may include connections, such as a wired network, wireless communication links, or fiber optic cables. Examples of the one or more communication networks 110 include local area networks (LAN), wide area networks (WAN) such as the Internet, or a combination thereof. The one or more communication networks 110 are, in some embodiments, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol. A connection to the one or more communication networks 110 may be established either directly (e.g., using 3G/4G connectivity to a wireless carrier), or through a network interface (e.g., a router, a switch, a gateway, a hub, or an intelligent, dedicated whole-home control node), or through any combination thereof. In some embodiments, the one or more communication networks 110 allow for communication using any suitable protocols, like Transmission Control Protocol/Internet Protocol (TCP/IP). In some embodiments, each vehicle 102 is communicatively coupled to the servers 104 via a cellular communication network.

In some embodiments, deep learning techniques are applied by the vehicles 102, the servers 104, or both, to process the vehicle data 112. For example, in some embodiments, after image data is collected by the cameras of one of the vehicles 102, the image data is processed using an object detection model to identify objects (e.g., road features including, but not limited to, vehicles, lane lines, shoulder lines, road dividers, traffic lights, traffic signs, road signs, cones, pedestrians, bicycles, and drivers of the vehicles) in the vehicle driving environment 100. In some embodiments, additional sensor data is collected and processed by a vehicle control model to generate a vehicle control instruction for controlling the vehicle control system. In some embodiments, a vehicle planning model is applied to plan a driving control process based on the collected sensor data and the vehicle driving environment 100. The object detection model, vehicle control model, and vehicle planning model are collectively referred to herein as vehicle data processing models, each of which includes one or more neural networks. In some embodiments, such a vehicle data processing model is applied by the vehicles 102, the servers 104, or both, to process the vehicle data 112 to infer associated vehicle status and/or provide control signals. In some embodiments, a vehicle data processing model is trained by a server 104, and applied locally or provided to one or more vehicles 102 for inference of the associated vehicle status and/or to provide control signals. Alternatively, a vehicle data processing model is trained locally by a vehicle 102, and applied locally or shared with one or more other vehicles 102 (e.g., by way of the server 104). In some embodiments, a vehicle data processing model is trained in a supervised, semi-supervised, or unsupervised manner.

Figure 2:
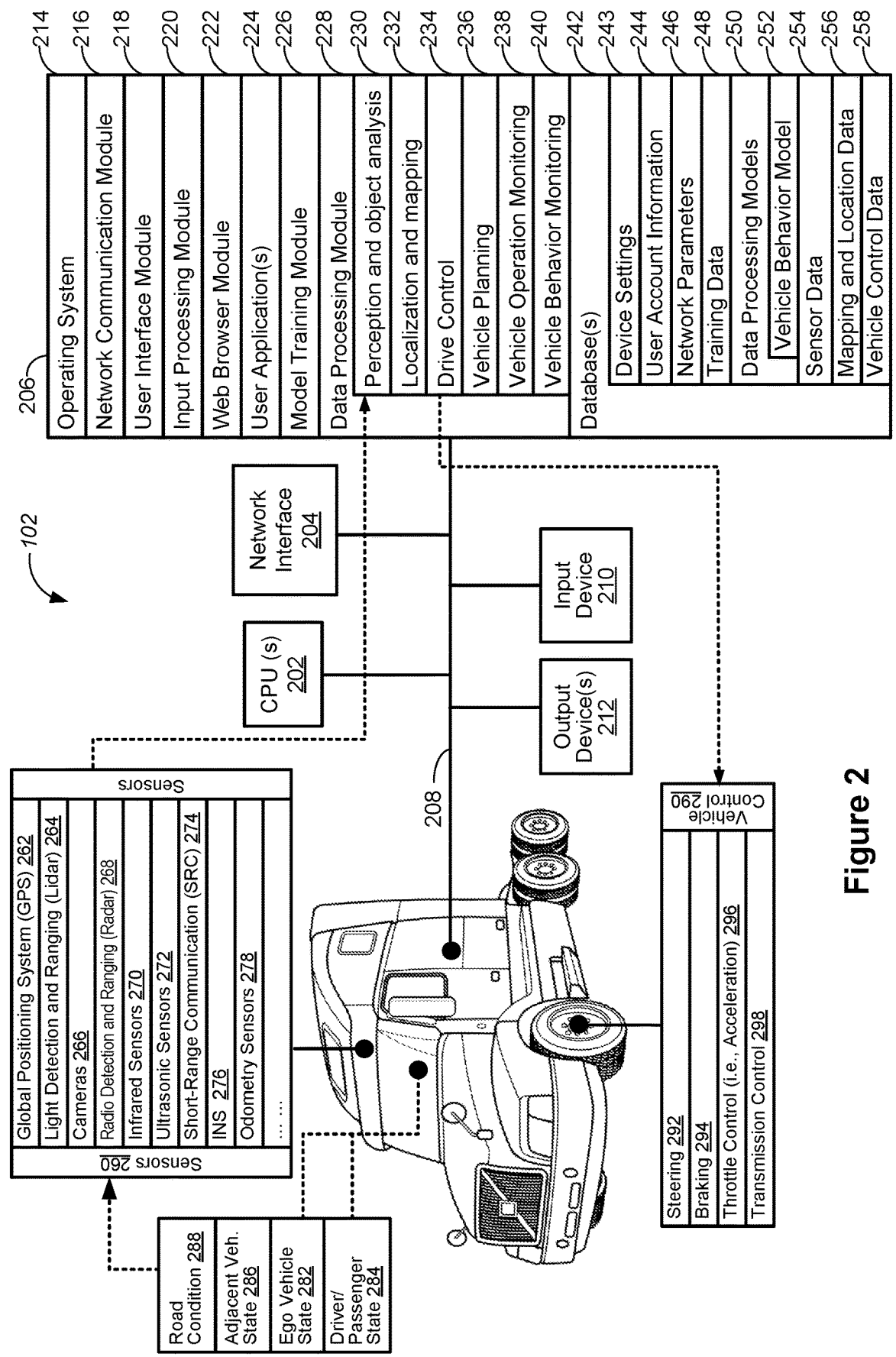
FIG. 2 is a block diagram of an example vehicle configured to be driven with a certain level of autonomy, in accordance with some embodiments.

FIG. 2 is a block diagram of an example vehicle 102 configured to be driven with a certain level of autonomy, in accordance with some embodiments. The vehicle 102 typically includes one or more processing units (CPUs) 202, one or more network interfaces 204, memory 206, and one or more communication buses 208 for interconnecting these components (sometimes called a chipset). The vehicle 102 includes one or more user interface devices. The user interface devices include one or more input devices 210, which facilitate user input, such as a keyboard, a mouse, a voice-command input unit or microphone, a touch screen display, a touch-sensitive input pad, a gesture capturing camera, or other input buttons or controls. Furthermore, in some embodiments, the vehicle 102 uses a microphone and voice recognition or a camera and gesture recognition to supplement or replace the keyboard. In some embodiments, the one or more input devices 210 include one or more cameras, scanners, or photo sensor units for capturing images, for example, of a driver and a passenger in the vehicle 102. The vehicle 102 also includes one or more output devices 212, which enable presentation of user interfaces and display content, including one or more speakers and/or one or more visual displays (e.g., a display panel located near to a driver's right hand in right-hand-side operated vehicles typical in the U.S.).

The vehicle 102 includes a plurality of sensors 260 configured to collect sensor data in a vehicle driving environment 100. The plurality of sensors 260 include one or more of a GPS 262, a LiDAR scanner 264, one or more cameras 266, a RADAR sensor 268, an infrared sensor 270, one or more ultrasonic sensors 272, a DSRC module 274, an INS 276 including accelerometers and gyroscopes, and an odometry sensor 278. The GPS 262 localizes the vehicle 102 in Earth coordinates (e.g., using a latitude value and a longitude value) and can reach a first accuracy level less than 1 meter (e.g., 30 cm). The LiDAR scanner 264 uses light beams to estimate relative distances between the scanner 264 and a target object (e.g., another vehicle 102), and can reach a second accuracy level better than the first accuracy level of the GPS 262. The cameras 266 are installed at different locations on the vehicle 102 to monitor surroundings of the camera 266 from different perspectives. In some situations, a camera 266 is installed facing the interior of the vehicle 102 and configured to monitor the state of the driver of the vehicle 102. The RADAR sensor 268 emits electromagnetic waves and collects reflected waves to determine the speed and a distance of an object over which the waves are reflected. The infrared sensor 270 identifies and tracks objects in an infrared domain when lighting conditions are poor. The one or more ultrasonic sensors 272 are used to detect objects at a short distance (e.g., to assist parking). The DSRC module 274 is used to exchange information with a road feature (e.g., a traffic light). The INS 276 uses the accelerometers and gyroscopes to measure the position, the orientation, and the speed of the vehicle. The odometry sensor 278 tracks the distance the vehicle 102 has travelled, (e.g., based on a wheel speed). In some embodiments, based on the sensor data collected by the plurality of sensors 260, the one or more processors 202 of the vehicle monitor its own vehicle state 282, the driver or passenger state 284, states of adjacent vehicles 286, and road conditions 288 associated with a plurality of road features.

The vehicle 102 has a control system 290, including a steering control 292, a braking control 294, a throttle control 296, a transmission control 298, signaling and lighting controls, and other controls. In some embodiments, one or more actuators of the vehicle control system 290 are automatically controlled based on the sensor data collected by the plurality of sensors 260 (e.g., according to one or more of the vehicle state 282, the driver or passenger state 284, states of adjacent vehicles 286, and/or road conditions 288).

The memory 206 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 206 includes one or more storage devices remotely located from one or more processing units 202. The memory 206, or alternatively the non-volatile the memory within the memory 206, includes a non-transitory computer readable storage medium. In some embodiments, the memory 206, or the non-transitory computer readable storage medium of the memory 206, stores the following programs, modules, and data structures, or a subset or superset thereof:

an operating system 214, which includes procedures for handling various basic system services and for performing hardware dependent tasks;

a network communication module 216, which connects each vehicle 102 to other devices (e.g., another vehicle 102, a server 104, or a client device 108) via one or more network interfaces (wired or wireless) and one or more communication networks 110, such as the Internet, other wide area networks, local area networks, metropolitan area networks, and so on;

a user interface module 218, which enables presentation of information (e.g., a graphical user interface for an application 224, widgets, websites and web pages thereof, audio content, and/or video content) at the vehicle 102 via one or more output devices 212 (e.g., displays or speakers);

an input processing module 220, which detects one or more user inputs or interactions from one of the one or more input devices 210 and interprets the detected input or interaction;

a web browser module 222, which navigates, requests (e.g., via HTTP), and displays websites and web pages thereof, including a web interface for logging into a user account of a user application 224 associated with the vehicle 102 or another vehicle;

one or more user applications 224, which are executed at the vehicle 102. The user applications 224 include a vehicle user application that controls the vehicle 102 and enables users to edit and review settings and data associated with the vehicle 102; a model training module 226, which trains a vehicle data processing model 250. The model 250 includes at least one neural network and is applied to process vehicle data (e.g., sensor data and vehicle control data) of the vehicle 102;

a data processing module 228, which performs a plurality of on-vehicle tasks, including, but not limited to, perception and object analysis 230, vehicle localization and environment mapping 232, vehicle drive control 234, vehicle drive planning 236, local operation monitoring 238, and vehicle driving behavior monitoring 240;

a vehicle database 242, which stores vehicle data 112, including:
- device settings 243, including common device settings (e.g., service tier, device model, storage capacity, processing capabilities, communication capabilities, and/or medical procedure settings) of the vehicle 102;
- user account information 244 for the one or more user applications 224 (e.g., user names, security questions, account history data, user preferences, and predefined account settings);
- network parameters 246 for the one or more communication networks 110, (e.g., IP address, subnet mask, default gateway, DNS server, and host name);
- training data 248 for training the vehicle data processing model 250;
- vehicle data processing models 250 for processing vehicle data 112. The vehicle data processing models 250 include a vehicle driving behavior model 252 applied to determine vehicle driving behaviors of the vehicle 102 and/or other adjacent vehicles 102;
- sensor data 254 captured or measured by the plurality of sensors 260;
- mapping and location data 256, which is determined from the sensor data 254 to map the vehicle driving environment 100 and locations of the vehicle 102 in the environment 100; and
- vehicle control data 258, which is automatically generated by the vehicle 102 or manually input by the user via the vehicle control system 290 to drive the vehicle 102.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 206 stores a subset of the modules and data structures identified above. In some embodiments, the memory 206 stores additional modules and data structures not described above.

Figure 3:
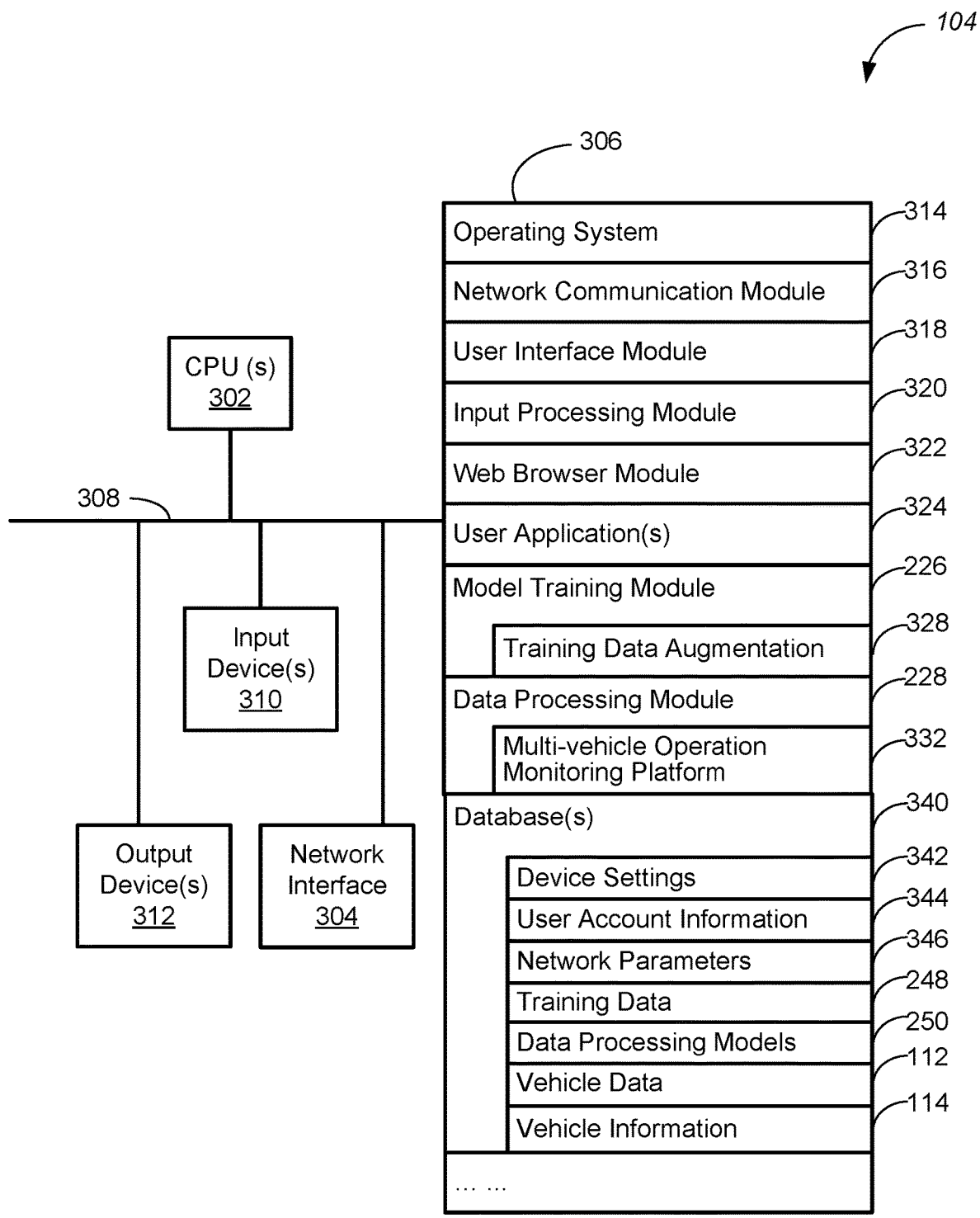
FIG. 3 is a block diagram of an example server for monitoring and managing vehicles in a vehicle driving environment, in accordance with some embodiments.

FIG. 3 is a block diagram of a server 104 for monitoring and managing vehicles 102 in a vehicle driving environment (e.g., the environment 100 in FIG. 1), in accordance with some embodiments. Examples of the server 104 include, but are not limited to, a server computer, a desktop computer, a laptop computer, a tablet computer, or a mobile phone. The server 104 typically includes one or more processing units (CPUs) 302, one or more network interfaces 304, memory 306, and one or more communication buses 308 for interconnecting these components (sometimes called a chipset). The server 104 includes one or more user interface devices. The user interface devices include one or more input devices 310, which facilitate user input, such as a keyboard, a mouse, a voice-command input unit or microphone, a touch screen display, a touch-sensitive input pad, a gesture capturing camera, or other input buttons or controls. Furthermore, in some embodiments, the server 104 uses a microphone and voice recognition or a camera and gesture recognition to supplement or replace the keyboard. In some embodiments, the one or more input devices 310 include one or more cameras, scanners, or photo sensor units for capturing images, for example, of graphic serial codes printed on electronic devices. The server 104 also includes one or more output devices 312, which enable presentation of user interfaces and display content, including one or more speakers and/or one or more visual displays.

The memory 306 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 306 includes one or more storage devices remotely located from one or more processing units 302. The memory 306, or alternatively the non-volatile memory within memory 306, includes a non-transitory computer readable storage medium. In some embodiments, the memory 306, or the non-transitory computer readable storage medium of the memory 306, stores the following programs, modules, and data structures, or a subset or superset thereof:

- an operating system 314, which includes procedures for handling various basic system services and for performing hardware dependent tasks;
- a network communication module 316, which connects the server 104 to other devices (e.g., vehicles 102, another server 104, and/or client devices 108) via one or more network interfaces (wired or wireless) and one or more communication networks 110, such as the Internet, other wide area networks, local area networks, metropolitan area networks, and so on;
- a user interface module 318, which enables presentation of information (e.g., a graphical user interface for user application 324, widgets, websites and web pages thereof, audio content, and/or video content) at the vehicle 102 via one or more output devices 312 (e.g., displays or speakers);

an input processing module 320, which detects one or more user inputs or interactions from one of the one or more input devices 310 and interprets the detected input or interaction;

a web browser module 322, which navigates, requests (e.g., via HTTP), and displays websites and web pages thereof, including a web interface for logging into a user account of a user application 324;

one or more user applications 324, which are executed at the server 104. The user applications 324 include a vehicle user application that associates vehicles 102 with user accounts and facilitates controlling the vehicles 102, and enables users to edit and review settings and data associated with the vehicles 102;

a model training module 226, which trains a vehicle data processing model 250. The model 250 includes at least one neural network and is applied to process vehicle data (e.g., sensor data and vehicle control data) of one or more vehicles 102;

a data processing module 228, which manages a multi-vehicle operation monitoring platform 332 configured to collect vehicle data 112 from a plurality of vehicles 102, monitor vehicle operation, detect faults, provide driving solutions, and update additional vehicle information 114 to individual vehicles 102 or client devices 108. The data processing module 228 manages vehicle data 112 for each individual vehicle 102 separately or processes vehicle data 112 of multiple vehicles 102 jointly (e.g., statistically, in the aggregate);

vehicle server data 340, including:
- device settings 342, which include common device settings (e.g., service tier, device model, storage capacity, processing capabilities, communication capabilities, and/or medical procedure settings) of the server 104;
- user account information 344 for the one or more user applications 324 (e.g., user names, security questions, account history data, user preferences, and predefined account settings);
- network parameters 346 for the one or more communication networks 110, (e.g., IP address, subnet mask, default gateway, DNS server, and host name);
- training data 248 for training the vehicle data processing model 250;
- vehicle data processing models 250 for processing vehicle data. The vehicle data processing models 250 include a vehicle driving behavior model 252 applied to determine vehicle driving behaviors of the vehicle 102 or other adjacent vehicles 102;
- vehicle data 112, which is collected from a plurality of vehicles 102 and includes sensor data 254, mapping and location data 256, and vehicle control data 258; and
- additional vehicle information 114, including vehicle operation information, fault information, and/or driving solution information, which are generated from the collected vehicle data 112.

In some embodiments, the model training module 226 includes a training data augmentation module 328 configured to synthesize training data based on a predefined dataset or collected sensor data of the vehicles 102. In some embodiments, the predefined dataset is used with the synthesized training data to train a vehicle data processing model 250. In some embodiments, the collected sensor data is used with the synthesized training data to train a vehicle data processing model 250. In some embodiments, the synthesized training data is used independently to train a vehicle data processing model 250. By these means, the training data can be augmented conveniently, allowing the vehicle data processing model 250 to be trained efficiently and offer a higher accuracy level.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 306 stores a subset of the modules and data structures identified above. In some embodiments, the memory 306 stores additional modules and data structures not described above.

Figure 4:
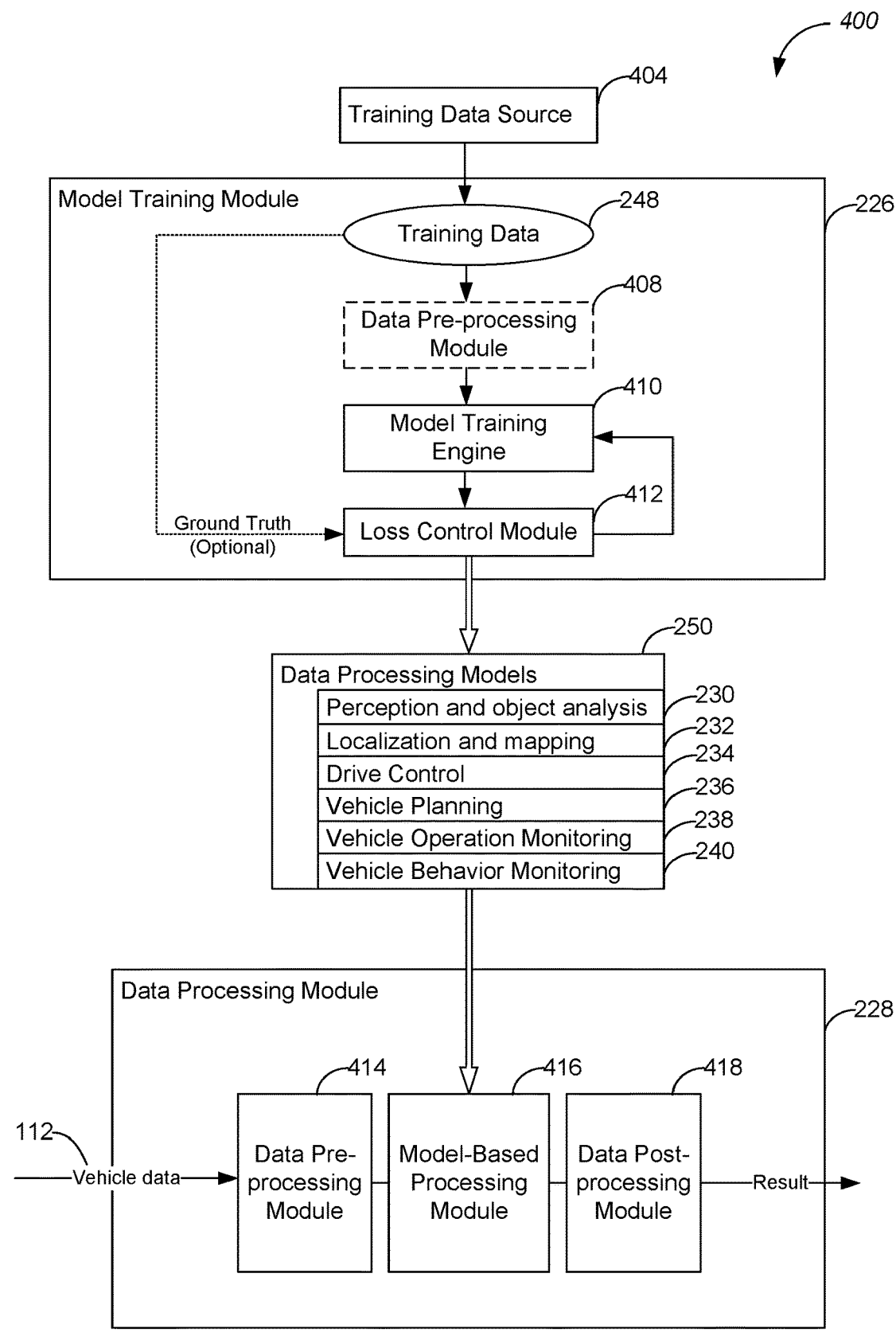
FIG. 4 is a block diagram of a machine learning system for training and applying vehicle data processing models for facilitating at least partial autonomous driving of a vehicle, in accordance with some embodiments.
Figure 5A:
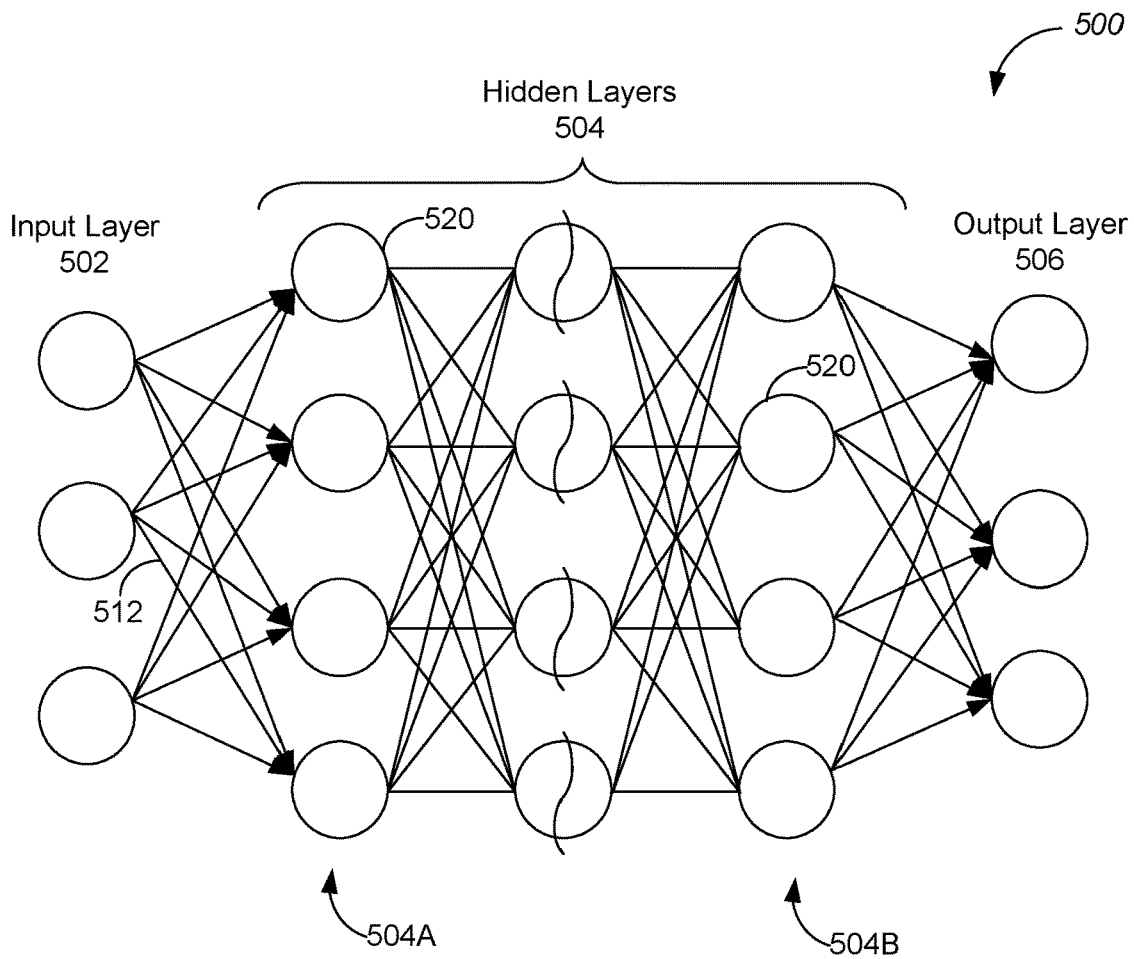
FIG. 5A is a structural diagram of an example neural network applied to process vehicle data in a vehicle data processing model, in accordance with some embodiments.
Figure 5B:
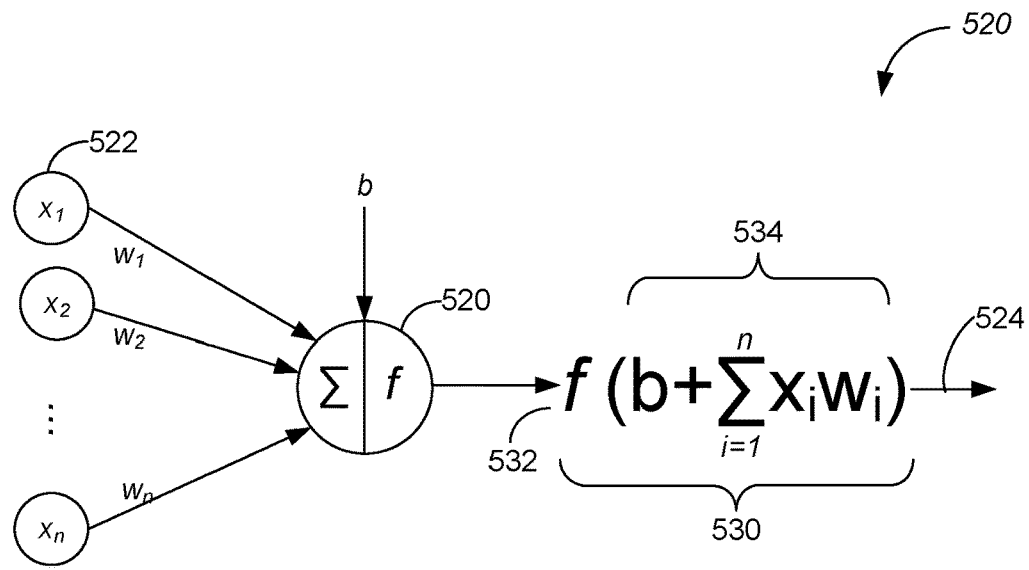
FIG. 5B is an example node in the neural network, in accordance with some embodiments.
Figure 6:
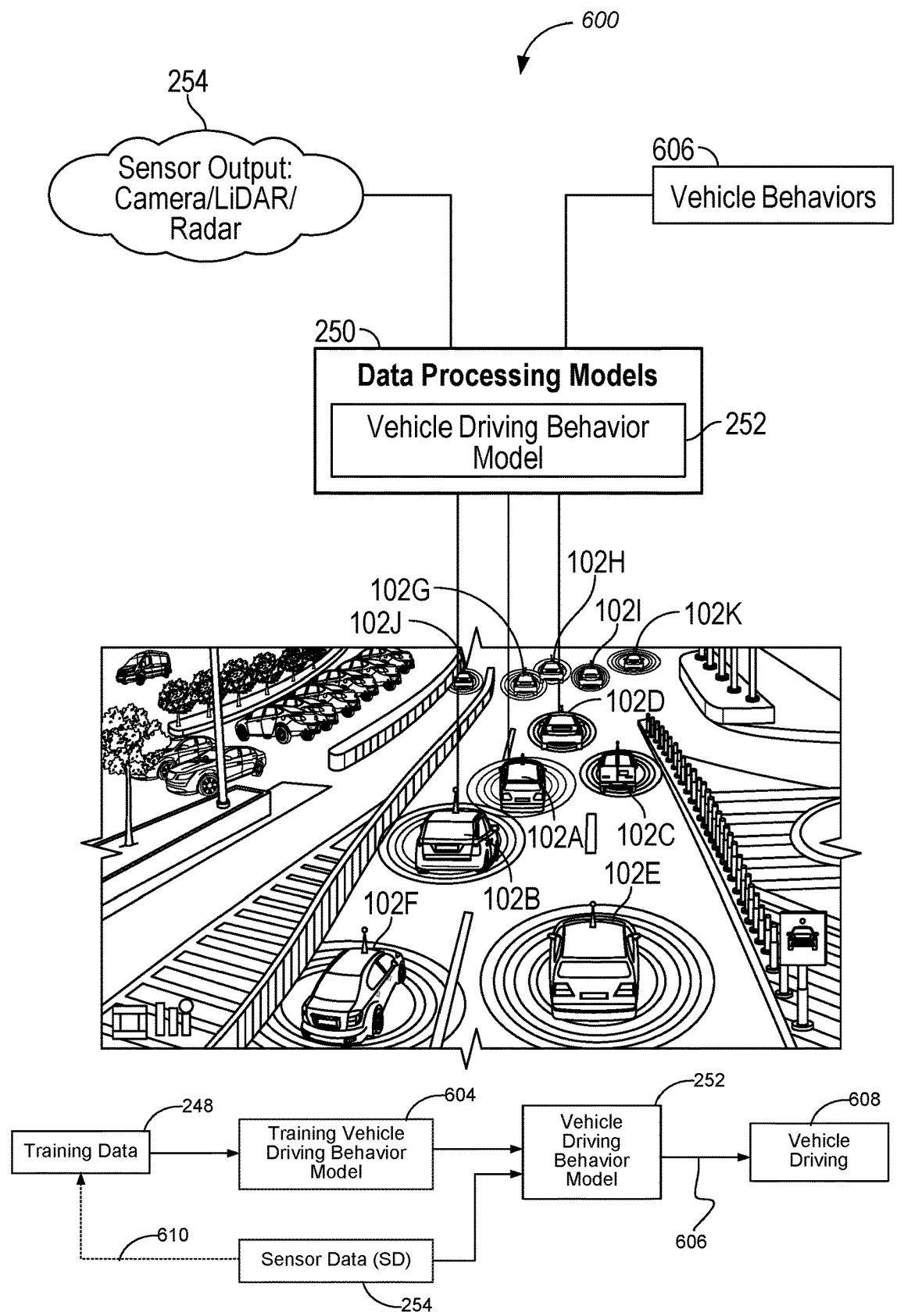
FIG. 6 is another example vehicle driving environment in which a vehicle trains a vehicle driving behavior model, in accordance with some embodiments.

FIGS. 4, 5A, and 5B provide background on the machine learning systems described herein, which are helpful in understanding the details of the embodiments described from FIG. 6 onward.

FIG. 4 is a block diagram of a machine learning system 400 for training and applying vehicle data processing models 250 for facilitating driving of a vehicle, in accordance with some embodiments. The machine learning system 400 includes a model training module 226 establishing one or more vehicle data processing models 250 and a data processing module 228 for processing vehicle data 112 using the vehicle data processing model 250. In some embodiments, both the model training module 226 (e.g., the model training module 226 in FIG. 2) and the data processing module 228 are located within the vehicle 102, while a training data source 404 provides training data 248 to the vehicle 102. In some embodiments, the training data source 404 is the data obtained from the vehicle 102 itself, from a server 104, from storage 106, or from another vehicle or vehicles 102. Alternatively, in some embodiments, the model training module 226 (e.g., the model training module 226 in FIG. 3) is located at a server 104, and the data processing module 228 is located in a vehicle 102. The server 104 trains the data processing models 250 and provides the trained models 250 to the vehicle 102 to process real-time vehicle data 112 detected by the vehicle 102. In some embodiments, the training data 248 provided by the training data source 404 include a standard dataset (e.g., a set of road images) widely used by engineers in the autonomous vehicle industry to train vehicle data processing models 250. In some embodiments, the training data 248 includes vehicle data 112 and/or additional vehicle information 114, which is collected from one or more vehicles 102 that will apply the vehicle data processing models 250 or collected from distinct vehicles 102 that will not apply the vehicle data processing models 250. The vehicle data 112 further includes one or more of sensor data 254, road mapping and location data 256, and control data 258. Further, in some embodiments, a subset of the training data 248 is modified to augment the training data 248. The subset of modified training data is used in place of or jointly with the subset of training data 248 to train the vehicle data processing models 250.

In some embodiments, the model training module 226 includes a model training engine 410, and a loss control module 412. Each vehicle data processing model 250 is trained by the model training engine 410 to process corresponding vehicle data 112 to implement a respective on-vehicle task. The on-vehicle tasks include, but are not limited to, perception and object analysis 230, vehicle localization and environment mapping 232, vehicle drive control 234, vehicle drive planning 236, local operation monitoring 238, and vehicle driving behavior monitoring 240. Specifically, the model training engine 410 receives the training data 248 corresponding to a vehicle data processing model 250 to be trained, and processes the training data to build the vehicle data processing model 250. In some embodiments, during this process, the loss control module 412 monitors a loss function comparing the output associated with the respective training data item to a ground truth of the respective training data item. In these embodiments, the model training engine 410 modifies the vehicle data processing models 250 to reduce the loss, until the loss function satisfies a loss criteria (e.g., a comparison result of the loss function is minimized or reduced below a loss threshold). The vehicle data processing models 250 are thereby trained and provided to the data processing module 228 of a vehicle 102 to process real-time vehicle data 112 from the vehicle.

In some embodiments, the model training module 402 further includes a data pre-processing module 408 configured to pre-process the training data 248 before the training data 248 is used by the model training engine 410 to train a vehicle data processing model 250. For example, an image pre-processing module 408 is configured to format road images in the training data 248 into a predefined image format. For example, the preprocessing module 408 may normalize the road images to a fixed size, resolution, or contrast level. In another example, an image pre-processing module 408 extracts a region of interest (ROI) corresponding to a drivable area in each road image or separates content of the drivable area into a distinct image.

In some embodiments, the model training module 226 uses supervised learning in which the training data 248 is labelled and includes a desired output for each training data item (also called the ground truth in some situations). In some embodiments, the desirable output is labelled manually by people or labelled automatically by the model training model 226 before training. In some embodiments, the model training module 226 uses unsupervised learning in which the training data 248 is not labelled. The model training module 226 is configured to identify previously undetected patterns in the training data 248 without pre-existing labels and with little or no human supervision. Additionally, in some embodiments, the model training module 226 uses partially supervised learning in which the training data is partially labelled.

In some embodiments, the data processing module 228 includes a data pre-processing module 414, a model-based processing module 416, and a data post-processing module 418. The data pre-processing modules 414 pre-processes vehicle data 112 based on the type of the vehicle data 112. In some embodiments, functions of the data pre-processing modules 414 are consistent with those of the pre-processing module 408, and convert the vehicle data 112 into a pre-defined data format that is suitable for the inputs of the model-based processing module 416. The model-based processing module 416 applies the trained vehicle data processing model 250 provided by the model training module 226 to process the pre-processed vehicle data 112. In some embodiments, the model-based processing module 416 also monitors an error indicator to determine whether the vehicle data 112 has been properly processed in the vehicle data processing model 250. In some embodiments, the processed vehicle data is further processed by the data post-processing module 418 to create a preferred format or to provide additional vehicle information 114 that can be derived from the processed vehicle data. The data processing module 228 uses the processed vehicle data to at least partially autonomously drive the vehicle 102 (e.g., at least partially autonomously). For example, the processed vehicle data includes vehicle control instructions that are used by the vehicle control system 290 to drive the vehicle 102.

FIG. 5A is a structural diagram of an example neural network 500 applied to process vehicle data in a vehicle data processing model 250, in accordance with some embodiments, and FIG. 5B is an example node 520 in the neural network 500, in accordance with some embodiments. It should be noted that this description is used as an example only, and other types or configurations may be used to implement the embodiments described herein. The vehicle data processing model 250 is established based on the neural network 500. A corresponding model-based processing module 416 applies the vehicle data processing model 250 including the neural network 500 to process vehicle data 112 that has been converted to a predefined data format. The neural network 500 includes a collection of nodes 520 that are connected by links 512. Each node 520 receives one or more node inputs 522 and applies a propagation function 530 to generate a node output 524 from the one or more node inputs. As the node output 524 is provided via one or more links 512 to one or more other nodes 520, a weight w associated with each link 512 is applied to the node output 524. Likewise, the one or more node inputs 522 are combined based on corresponding weights $w_1$, $w_2$, $w_3$, and $w_4$ according to the propagation function 530. In an example, the propagation function 530 is computed by applying a non-linear activation function 532 to a linear weighted combination 534 of the one or more node inputs 522.

The collection of nodes 520 is organized into layers in the neural network 500. In general, the layers include an input layer 502 for receiving inputs, an output layer 506 for providing outputs, and one or more hidden layers 504 (e.g., layers 504A and 504B) between the input layer 502 and the output layer 506. A deep neural network has more than one hidden layer 504 between the input layer 502 and the output layer 506. In the neural network 500, each layer is only connected with its immediately preceding and/or immediately following layer. In some embodiments, a layer is a "fully connected" layer because each node in the layer is connected to every node in its immediately following layer. In some embodiments, a hidden layer 504 includes two or more nodes that are connected to the same node in its immediately following layer for down sampling or pooling the two or more nodes. In particular, max pooling uses a maximum value of the two or more nodes in the layer for generating the node of the immediately following layer.

In some embodiments, a convolutional neural network (CNN) is applied in a vehicle data processing model 250 to process vehicle data (e.g., video and image data captured by cameras 266 of a vehicle 102). The CNN employs convolution operations and belongs to a class of deep neural networks. The hidden layers 504 of the CNN include convolutional layers. Each node in a convolutional layer receives inputs from a receptive area associated with a previous layer (e.g., nine nodes). Each convolution layer uses a kernel to combine pixels in a respective area to generate outputs. For example, the kernel may be to a 3×3 matrix including weights applied to combine the pixels in the respective area surrounding each pixel. Video or image data is pre-processed to a predefined video/image format corresponding to the inputs of the CNN. In some embodiments, the pre-processed video or image data is abstracted by the CNN layers to form a respective feature map. In this way, video and image data can be processed by the CNN for video and image recognition or object detection.

In some embodiments, a recurrent neural network (RNN) is applied in the vehicle data processing model 250 to process vehicle data 112. Nodes in successive layers of the RNN follow a temporal sequence, such that the RNN exhibits a temporal dynamic behavior. In an example, each node 520 of the RNN has a time-varying real-valued activation. It is noted that in some embodiments, two or more types of vehicle data are processed by the data processing module 228, and two or more types of neural networks (e.g., both a CNN and an RNN) are applied in the same vehicle data processing model 250 to process the vehicle data jointly.

The training process is a process for calibrating all of the weights $w_i$ for each layer of the neural network 500 using training data 248 that is provided in the input layer 502. The training process typically includes two steps, forward propagation and backward propagation, which are repeated multiple times until a predefined convergence condition is satisfied. In the forward propagation, the set of weights for different layers are applied to the input data and intermediate results from the previous layers. In the backward propagation, a margin of error of the output (e.g., a loss function) is measured (e.g., by a loss control module 412), and the weights are adjusted accordingly to decrease the error. The activation function 532 can be linear, rectified linear, sigmoidal, hyperbolic tangent, or other types. In some embodiments, a network bias term b is added to the sum of the weighted outputs 534 from the previous layer before the activation function 532 is applied. The network bias b provides a perturbation that helps the neural network 500 avoid over fitting the training data. In some embodiments, the result of the training includes a network bias parameter b for each layer.

FIG. 6 is another example vehicle driving environment 600 in which a vehicle 102 (e.g., a first vehicle 102A) trains a vehicle driving behavior model 252, in accordance with some embodiments. The first vehicle 102A has one or more processors 202, memory 206, a plurality of sensors 260, and a vehicle control system 290. The first vehicle 102A collects vehicle data 112 while the first vehicle 102A is driving in the vehicle driving environment 600, and applies the collected vehicle data 112 as training data 248 to train (604) the vehicle driving behavior model 252 locally on the vehicle. The vehicle driving behavior model 252 is applied locally to predict vehicle behavior 606, allowing the first vehicle 102A to be adjusted, controlled, or driven (608) adaptively. In some situations, the vehicle driving behavior model 252 is trained using sensor data been collected by the vehicle periodically, according to a predefined training schedule, or upon request. In some embodiments, once trained and updated, the vehicle driving behavior model 252 is provided to a server 104 periodically, according to a predefined reporting schedule, or upon request, and used by the server 104 to monitor the first vehicle 102A or facilitate driving of one or more target vehicles 102 distinct from the first vehicle 102A.

The vehicle data 112 includes at least a temporal sequence of sensor data 254. The first vehicle 102A collects the vehicle data 112 via the plurality of sensors 260, and uses the vehicle data 112 as training data 248. The training data 248 includes data for one or more vehicles 102 appearing in the same vehicle driving environment 600 during a collection period. The training data 248 is optionally stored in local memory (e.g., in a vehicle device database 242) of the first vehicle 102A. The one or more vehicles 102 includes the first vehicle 102A, adjacent vehicles 102B-102D, or all other remaining vehicles 102E-102K. The first vehicle 102A is also called an ego vehicle, and measures the environment 600 around itself via the plurality of sensors 260. The adjacent vehicles 102B-102D are located around the first vehicle 102A, e.g., within a predefined range of the first vehicle 102A, and are optionally immediately adjacent to the first vehicle 102A. The remaining vehicles 102E-102K operate in the same vehicle driving environment 600 and may move closer to the first vehicle 102A to become an adjacent vehicle. After the training data 248 is collected at the first vehicle 102A, a machine learning system of the first vehicle 102A (e.g., a model training module 226) trains the vehicle driving behavior model 252 using the collected training data 248. The vehicle driving behavior model 252 is configured to predict a behavior 606 of the one or more vehicles 102, e.g., the first vehicle's own behavior, one of the adjacent vehicles' behaviors, or one of the remaining vehicles' behaviors.

In some embodiments, the training data 248 is not limited to data for the first vehicle 102A or data for the adjacent vehicles 102B-102D, and further includes data for road objects that appear on a road and in measurement ranges of the plurality of sensors 260. The road objects include, for example, one or more of: lane lines, shoulder lines, road dividers, traffic lights, traffic signs, road signs, cones, pedestrians, bicycles, and, in some embodiments, even the driver of the first vehicle 102A. The data for road objects is applied to train one or more vehicle models, e.g., a vehicle driving behavior model 252. Additionally, in some embodiments, the training data 248 further includes vehicle control data 258 of the first vehicle 102A.

After the vehicle driving behavior model 252 is trained, the first vehicle 102A subsequently collects sensor data 254 from the plurality of sensors 260 and applies the vehicle driving behavior model 252 to predict vehicle behavior 606 based on the collected sensor data 254. The predicted vehicle behavior 606 is used to drive the first vehicle 102A, e.g., at least partially autonomously. In some embodiments, the one or more vehicles 102 whose vehicle data 112 is collected as training data 248 include the first vehicle 102A itself, and the collected training data 248 includes data for the first vehicle 102A. In some embodiments, the vehicle driving behavior model 252 is configured to predict the behavior 606 of the first vehicle 102A. The vehicle data processing module 228 of the first vehicle 102A applies the vehicle driving behavior model 252 to the collected sensor data 254 to predict vehicle behavior 606 of the first vehicle 102A. An example of the predicted vehicle behavior 606 of the first vehicle 102A includes how the first vehicle 102A responds to yellow traffic lights. Further, in some embodiments, the collected sensor data 254 is added (610) to the training data 248 and applied in a subsequent round of training 604 of the vehicle driving behavior model 252.

Alternatively and additionally, in some embodiments, the one or more vehicles 102 whose vehicle data 112 is collected by the first vehicle 102 (i.e., the ego vehicle) as training data 248 include a plurality of adjacent vehicles 102B-102D that are near to the first vehicle 102A. The collected training data 248 includes data for the plurality of adjacent vehicles 102B-102D. The vehicle driving behavior model 252 is configured to predict behavior 606 of a third vehicle 102 that would appear near the first vehicle 102A. The vehicle data processing module 228 of the first vehicle 102A applies the vehicle driving behavior model 252 to the collected sensor data 254 to predict vehicle behavior 606 of the third vehicle 102. Examples of the predicted vehicle behavior 606 include how quickly an adjacent vehicle 102B changes lanes, how the adjacent vehicles 102B-102D respond to yellow traffic lights, and whether an adjacent vehicle 102B is being driven aggressively or conservatively. More specifically, in an example now shown in FIG. 6, the first vehicle 102A is a truck driving on a rightmost lane of a highway for a majority of its driving time, and the vehicle driving behavior model 252 indicates how adjacent vehicles on the left hand side (for the U.S.) of the truck change to the rightmost lane and in front of the truck, including distances the adjacent vehicles keep from the truck after lane switching and relative speeds the adjacent vehicles use to change to the rightmost lane. In some embodiments, the vehicle behaviors 606 are associated with actions of one or more actuators 292-298 of the vehicle control system 290 of one of the first vehicle 102A and adjacent vehicles 102B-102D. For example, the relative speeds the adjacent vehicles use to change to the rightmost lane indicate that the adjacent vehicles apply a high throttle control that exceeds a throttling threshold.

In some embodiments, a vehicle type is automatically considered in the vehicle driving behavior model 252 to predict the behaviors 606 of the adjacent vehicles 102B-102D and the remaining vehicles 102E-102K. The plurality of sensors 260 include a camera 266, and the collected training data 248 includes a plurality of images captured by the camera 266. The adjacent vehicles 102B-102D correspond to a plurality of vehicle types. During the collection period for collecting the training data 248, each of the adjacent vehicles 102B-102D appears near the first vehicle 102A (e.g., within a predefined range of the first vehicle 102A). For example, each adjacent vehicle 102B-102B is less than 10 meters from the first vehicle 102A. The plurality of vehicle types of the adjacent vehicles 102B-102D are determined from the plurality of images. The vehicle driving behavior model 252 is trained using the plurality of images to predict behavior 606 of the adjacent vehicles 102B-102D based on the plurality of vehicle types. For example, each of the adjacent vehicles 102B-102D switches a lane to drive immediately in front of the first vehicle 102A during the collection period. The adjacent vehicles 102B and 102C are sedans, and the adjacent vehicle 102D is a taxi. The relative speeds the sedans and taxi use to switch lanes are distinct from each other based on the vehicle driving behavior model 252.

In some embodiments, the one or more vehicles 102 whose vehicle data 112 is collected as training data 248 include a plurality of adjacent vehicles 102B-102D that are near the first vehicle 102A during the collection period. The plurality of sensors 260 include at least a LiDAR scanner 264 and an INS 276 including accelerometers and gyroscopes. The training data 248 collected during the collection period includes relative positions that are measured between the first vehicle 102A and the adjacent vehicles 102B-102D by the LiDAR scanner 264 and the relative motion (e.g., relative speeds and accelerations) measured between the first vehicle 102A and the adjacent vehicles 102B-102D by the INS 276 during the collection period.

In some embodiments, the vehicle driving behavior model 252 is trained using unused on-vehicle processing capabilities of the first vehicle 102, while the first vehicle 102A is charging, driving, or parked. In some situations, the first vehicle 102A has excessive computational resources beyond what is used to control driving of the first vehicle 102A in real time. In these embodiments, the vehicle driving behavior model 252 is trained while the first vehicle 102A is driving on a road. Alternatively, in some situations, the first vehicle 102A has limited computational resources that prioritize driving of the first vehicle 102A. In these embodiments, the vehicle driving behavior model 252 is trained while the first vehicle 102A is not driving (i.e., parked). Further, in some embodiments, the vehicle driving behavior model 252 is trained, while the first vehicle 102A is parked and connected to a charge station to avoid model training uses up a power of a battery of the first vehicle 102A.

Figure 7A:
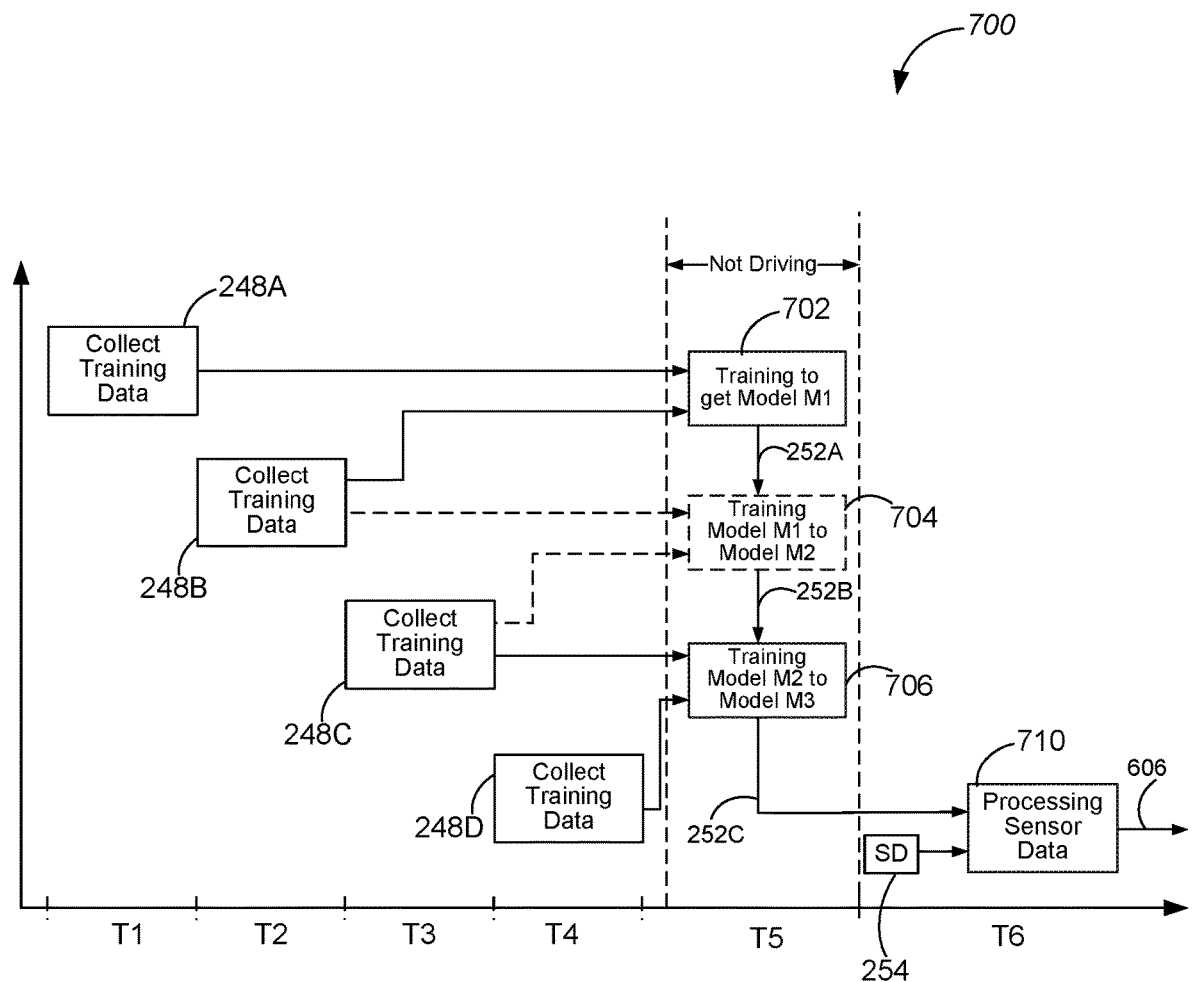
FIGS. 7A and 7B are temporal diagrams of example processes of training a vehicle driving behavior model locally on a vehicle, in accordance with some embodiments.
Figure 7B:
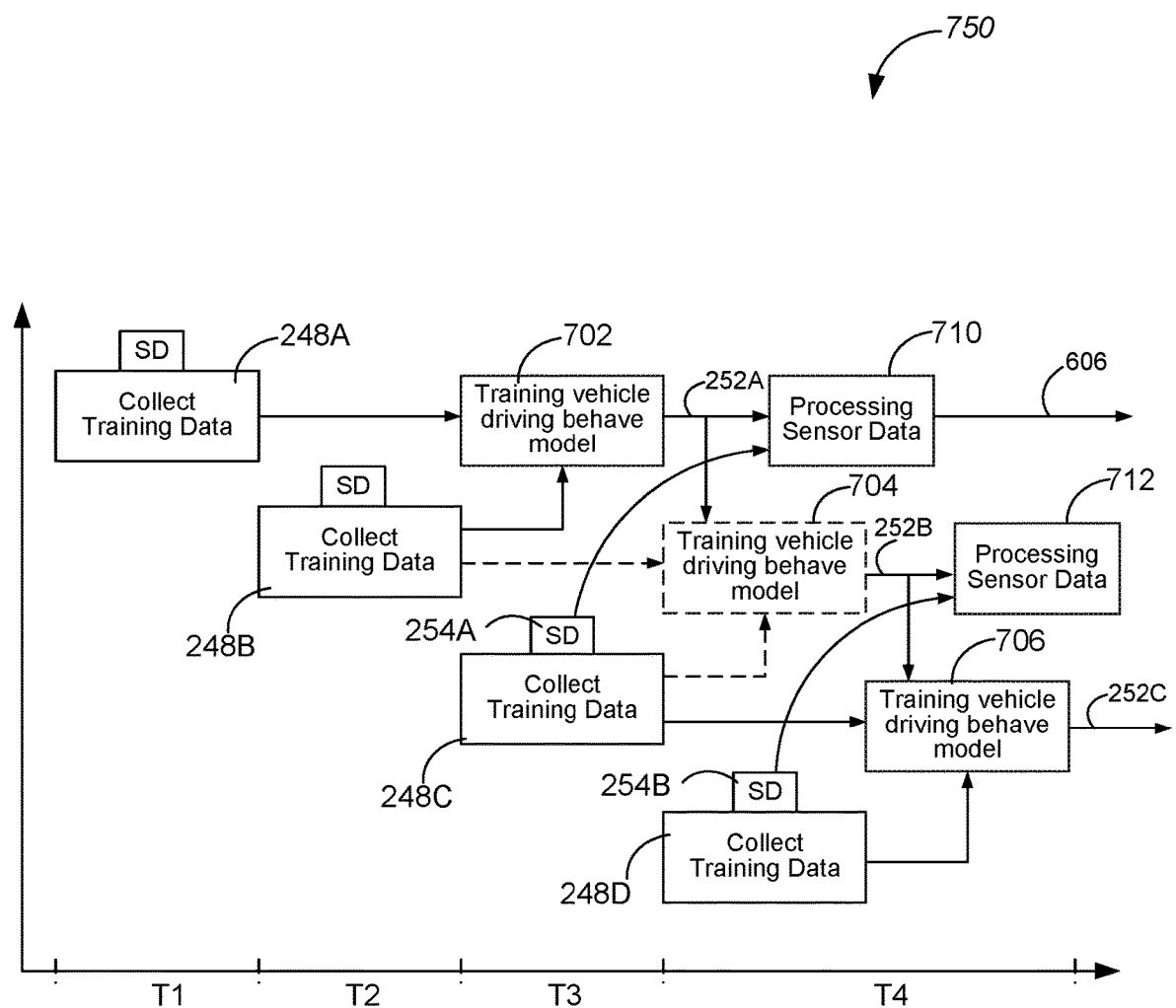

FIGS. 7A and 7B are temporal diagrams 700 and 750 of example processes of training a vehicle driving behavior model 252 locally on a vehicle 102 (e.g., the first vehicle 102A in FIG. 6), in accordance with some embodiments. The collected training data 248 includes a first set of training data 248A captured during a first duration of time $T_1$ and a second set of training data 248B captured during a second duration of time $T_2$ following the first duration of time $T_1$. The first vehicle 102A uses machine learning to train the vehicle driving behavior model 252. Specifically, during training 702, the first vehicle 102A determines behavior 606 of one or more vehicles 102 (e.g., the first vehicle 102A or adjacent vehicles 102B-102D) from the first set of training data 248A using the vehicle driving behavior model 252, compares the determined behavior 606 of the one or more vehicles 102 with the second set of training data 248B, and modifies one or more weights of a neural network of the vehicle driving behavior model 252 based on a comparison result. Stated another way, the set of training data 248B captured during the second duration of time $T_2$ results from the first set of training data 248A captured during the first duration of time $T_1$, and can be applied as a ground truth during training 702.

In some embodiments, the collected training data 248 includes a third set of training data 248C captured during a third duration of time $T_3$ following the second duration of time $T_2$ and a fourth set of training data 248D captured during a fourth duration of time $T_4$ following the first duration of time $T_3$. During training 704 or 706, the first vehicle 102A determines behavior 606 of the one or more vehicles 102 from the second or third set of training data 248B or 248C using the vehicle driving behavior model 252, compares the respective behavior 606 of the one or more vehicles 102 with the third or fourth set of training data 248C or 248D, and modifies one or more weights of the neural network of the vehicle driving behavior model 252 based on a corresponding comparison result.

Referring to FIG. 7A, in some embodiments, model training is implemented after collecting the training data 248A-248D. In an example, the training data 248A-248D is collected during the collection period while the first vehicle 102A is driving on a road. The vehicle driving behavior model 252 is trained during a fifth duration of time $T_5$ after the collection period, e.g., when the first vehicle 102A is parked. During training 702, the vehicle driving behavior model 252 is trained to a first vehicle driving behavior model 252A. During training 704 and subsequent to training 702, the first vehicle driving behavior model 252A is trained to a second vehicle driving behavior model 252B. During training 706 and subsequent to training 704, the second vehicle driving behavior model 252B is trained to a third vehicle driving behavior model 252C. Subsequently when the first vehicle 102A is back on the road, e.g., during a sixth duration of time $T_6$, the sensor data 254 collected from the plurality of sensors 260 is used by the third vehicle driving behavior model 252C to predict the vehicle behavior 606 from the sensor data 254. The sensor data 254 are also added to the training data 248 to iteratively train the third vehicle driving behavior model 252C, after applying the third vehicle driving behavior model 252C to predict the vehicle behavior 606. For example, the training data 248, updated with the sensor data 254, is applied to train the third vehicle driving behavior model 252C, when the first vehicle 102A is parked after the sixth duration of time $T_6$.

In some embodiments, model training is implemented in synchronization with collection of the training data 248A-248D and application of the vehicle behavior model 252 to determine the vehicle behavior 606. This happens because the first vehicle 102A has excessive computational resources beyond what is used to control driving of the first vehicle 102A in real time. The vehicle driving behavior model 252 is trained using unused on-vehicle processing capabilities of the first vehicle 102, while the first vehicle 102A is driving. Referring to FIG. 7B, the vehicle driving behavior model 252 includes a first vehicle driving behavior model 252A, e.g., resulting from training (702) using the first and second sets of training data 248A and 248B. The first vehicle driving behavior model 252A is further trained (704) using the collected training data 248B and 248C to generate a second vehicle driving behavior model 252B, at least partially concurrently when the first vehicle driving behavior model 252A is used to predict (710) the vehicle behavior 606 from the collected sensor data 254. The second vehicle driving behavior model 252B is trained (706) using the collected training data 248C and 248D to generate the third vehicle driving behavior model 252C, at least partially concurrently when the first vehicle driving behavior model 252A is used to predict (710) the vehicle behavior 606 from the collected sensor data 254. The collected sensor data 254 is added to the collected training data, e.g., the third set of training data 248C and the fourth set of training data 248D. Further, in some embodiments, the collected sensor data 254 including first sensor data 254A. The first vehicle 102 collects second sensor data 254B from the plurality of sensors 260 after collecting the first sensor data 254A. While continuing to train the second vehicle driving behavior model 252B with the training data 248 added with the first sensor data 254A, the second vehicle driving behavior model 252B is applied to predict (712) the vehicle behavior 606 based on the second sensor data 254B.

Further, in some embodiments, the sensor data 254A and 254B collected by the plurality of sensors 260 are added to the training data 248C and 248D, respectively. The sensor data 254A and 254B are processed to generate vehicle behavior 606 by the vehicle driving behavior models 252A and 252B that are previously trained, and applied in the training data 248C and 248D to train the vehicle driving behavior models 252B and 252C.

Figure 8:
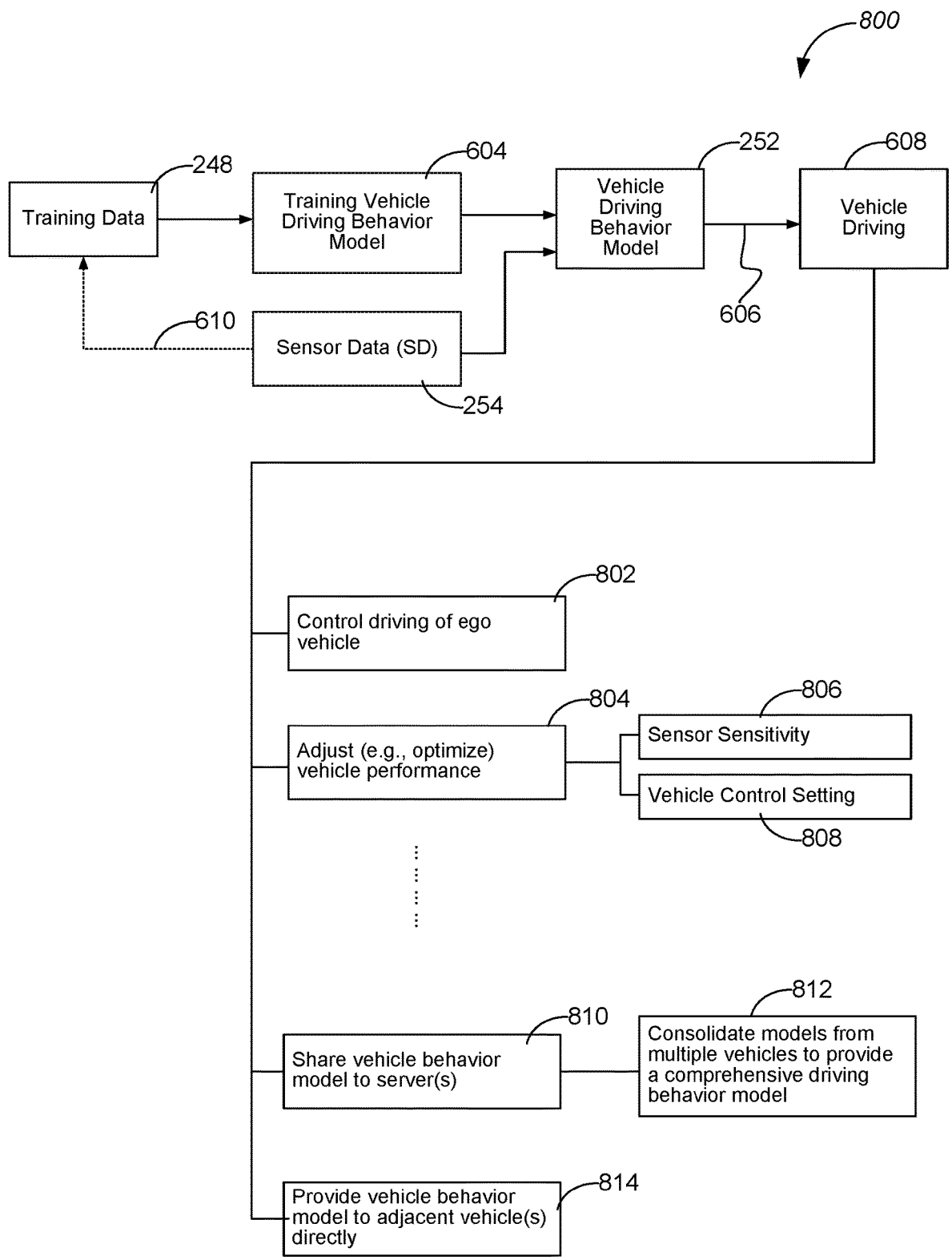
FIG. 8 is a flow diagram of an example process of utilizing a vehicle driving behavior model trained locally on a vehicle, in accordance with some embodiments.

FIG. 8 is a flow diagram of an example process 800 of utilizing a vehicle driving behavior model 252 that was trained locally on a vehicle 102 (e.g., a first vehicle 102A), in accordance with some embodiments. Before applying the vehicle driving behavior model 252 to predict vehicle behavior 606 based on sensor data 254, the first vehicle 102A collects training data 248 via the plurality of sensors 260. The training data 248 includes data for one or more vehicles 102 during a collection period. Specifically, the training data 248 includes sensor data 254 of the first vehicle 102A, vehicle control data 258 of the first vehicle 102A, sensor data 254 of one or more adjacent vehicles 102B-10D, and vehicle control data 258 of the one or more adjacent vehicles 102B-10D. In some embodiments, the training data 248 includes mapping and location data 256 associated with the first vehicle 102. In some embodiments, the training data 248 includes data for road objects (e.g., lane lines, shoulder lines, road dividers, traffic lights, traffic signs, road signs, cones, a pedestrian, a bicycle, and a driver of the first vehicle 102A). These road objects appear on a road and in measurement ranges of the plurality of sensors. Machine learning is applied locally at the first vehicle 102A to train (604) the vehicle driving behavior model 252 using the collected training data 248. Subsequently, during data inference, sensor data 254 is collected from the plurality of sensors 260. The first vehicle 102A (specifically, the vehicle data processing module 228) applies the vehicle driving behavior model 252 to predict vehicle behavior 606 based on the collected sensor data 254 and enable driving (608) the first vehicle 102A, e.g., at least partially autonomously.

In some embodiments, a vehicle control model (e.g., applied in the vehicle drive control 234 in FIG. 2) is used together with the vehicle driving behavior model 252 to drive (802) the first vehicle 102A, e.g., at least partially autonomously. In accordance with a determination that the first vehicle 102A operates in an at least partial autonomous driving mode, the data processing module 228 provides the predicted vehicle behavior 606 to the vehicle control model. Based on the predicted vehicle behavior 606, the vehicle control model is to generate a vehicle control instruction for controlling the first vehicle 102A to drive with a level of autonomy.

In some embodiments, the predicted vehicle behavior 606 is not used to control the first vehicle 102A directly. Rather, the predicted vehicle behavior 606 is applied to adjust (804) vehicle parameters of the first vehicle 102A to achieve better vehicle performance, e.g., energy saving or driving experience. The first vehicle 102A has a plurality of vehicle parameters, and each of the plurality of sensors 260 and the vehicle control system 290 operates according to a respective vehicle parameter. The vehicle driving behavior model 252 is coupled to a vehicle adjustment module that is configured to determine the plurality of vehicle parameters. The first vehicle 102A provides the predicted vehicle behavior 606 to the vehicle adjustment module. The vehicle adjustment module updates the plurality of vehicle parameters based on the predicted vehicle behavior 606. The first vehicle 102A generates a vehicle adjustment instruction based on the plurality of vehicle parameters that are updated.

Further, in some situations, one of the plurality of sensors 260 (e.g., LiDAR 264, INS 276) has a first sensitivity 806, and the plurality of vehicle parameters include the first sensitivity 806 of the one of the plurality of sensors 260. In response to the vehicle adjustment instruction, the first vehicle 102A adjusts the first sensitivity 806 of the one of the plurality of sensors 260 in response to the predicted vehicle behavior 606. For example, the first vehicle 102A is driven in quiet streets on the countryside, and the first sensitivity 806 is reduced such that the first vehicle 292A operates in an energy efficient mode. In some situations, a portion of the vehicle control system 290 (e.g., brake) has a vehicle control setting 808, and the plurality of vehicle parameters include the vehicle control setting 808 of the portion of the vehicle control system 290. In response to the vehicle adjustment instruction, the first vehicle 102A adjusts the vehicle control setting 808 of the portion of the vehicle control system 290 in response to the predicted vehicle behavior 606. For example, the first vehicle 102A is driven in crowded streets of a city, and a response rate of the braking control 294 is increased to avoid hitting onto another car.

In some embodiments, the first vehicle 102A provides (810) the vehicle driving behavior model 252 that is trained using the collected training data 248 to a server 104. The server 104 is communicatively coupled to the first vehicle 102A via one or more communication networks 110. Further, in some embodiments, the server 104 is configured to consolidate (812) a plurality of driving behavior models provided by a plurality of vehicles 102, generate a comprehensive driving behavior model, and provide the comprehensive driving behavior model to one or more target vehicles 102. In some embodiments, the plurality of vehicles includes the first vehicle 102A. In some embodiments, the plurality of vehicles 102 do not include the first vehicle 102A. Optionally, the one or more target vehicles 102 include the first vehicle 102A or do not include the first vehicle 102A. In an example, the one or more target vehicles 102 are distinct from the first vehicle 102A. In another example, the vehicle driving behavior model 252 is reported to the server 104 by the first vehicle 102A, and the comprehensive driving behavior model is returned to the first vehicle 102A to update the vehicle driving behavior model 252.

In some embodiments, the vehicle driving behavior model 252 that is trained using the collected training data 248 is provided directly (814) to an alternative vehicle 102 (e.g., an adjacent vehicle next to the first vehicle 102A). The alternative vehicle 102 is communicatively coupled to the first vehicle 102A via a wired or wireless link and configured to be driven, e.g., at least partially autonomously, by applying the vehicle driving behavior model 252 to predict associated vehicle behavior 606.

FIGS. 9A-9D is a flow diagram of an example method 900 for on-vehicle behavior modeling of vehicles 102, in accordance with some embodiments. In some embodiments, the method 900 is governed by instructions that are stored in a non-transitory computer readable storage medium and are executed by one or more processors of a first vehicle 102A. Each of the operations shown in FIGS. 9A-9D may correspond to instructions stored in the computer memory or computer readable storage medium (e.g., the memory 206 in FIG. 2) of the first vehicle 102A. The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in the method 900 may be combined and/or the order of some operations may be changed. The first vehicle 102A has (902) a plurality of sensors 260 and a vehicle control system 290. The first vehicle 102A is also called an ego vehicle configured to perceive an environment around itself via the plurality of sensors 260. In some embodiments, the plurality of sensors 260 include (904) one or more of: a global positioning system (GPS), a light detection and ranging (LiDAR) scanner, one or more cameras, a radio detection and ranging (RADAR) sensor, an infrared sensor, one or more ultrasonic sensors, a dedicated short-range communication (DSRC) module, an inertial navigation system (INS) including accelerometers and gyroscopes, and an odometry sensor.

The first vehicle 102A collects (906) training data 248 via the plurality of sensors 260, and the training data 248 includes data for one or more vehicles 102 during a collection period. Locally at the first vehicle 102A, machine learning is applied (908) to train a vehicle driving behavior model 252 using the collected training data 248. The vehicle driving behavior model 252 is configured to predict a behavior of one or more vehicles 102. In some situations, the vehicle driving behavior model 252 is trained (910) using unused on-vehicle processing capabilities of the first vehicle 102A, while the first vehicle 102A is charging, driving, or parked. The collected training data 248 is optionally stored in the memory of the first vehicle 102A. The first vehicle 102A subsequently collects (912) sensor data from the plurality of sensors 260, and drives (914) the vehicle by applying the vehicle driving behavior model 252 to predict vehicle behavior based on the collected sensor data. Particularly, the first vehicle 914 may drive the vehicle at least partially autonomously. In some embodiments, the one or more vehicles 102 include (916) the first vehicle 102A, and the collected training data 248 includes data for the first vehicle 102A. The vehicle driving behavior model 252 is configured to predict behavior of the first vehicle 102A. The vehicle driving behavior model 252 is applied (918) to the collected sensor data to predict vehicle behavior of the first vehicle 102A. Alternatively, in some embodiments, the one or more vehicles 102 include (920) a plurality of second vehicles (e.g., adjacent vehicles 102B-102D) that are near the first vehicle 102A, and the collected training data 248 includes data for the plurality of second vehicles. The vehicle driving behavior model 252 is configured to predict behavior of a third vehicle that appears near the first vehicle 102A. The vehicle driving behavior model 252 is applied (922) to the collected sensor data to predict vehicle behavior of the third vehicle.

In some embodiments, the one or more vehicles 102 from which the training data 248 is collected include (924) one or more second vehicles (e.g. adjacent vehicles 102B-102D in FIG. 6) near the first vehicle 102A during the collection period. The plurality of sensors 260 include (926) at least a LiDAR scanner and an INS including accelerometers and gyroscopes. The training data 248 includes (928) relative positions that are measured between the first vehicle 102A and the one or more second vehicles by the LiDAR scanner and relative motions (e.g., speeds and accelerations) measured between the first vehicle 102A and the one or more second vehicles by the INS during the collection period. In some embodiments, in addition to the data for the one or more vehicles 102, the first vehicle 102A also collects (930) data for road objects that appear on a road and in measurement ranges of the plurality of sensors 260. The road objects include one or more of: lane lines, shoulder lines, road dividers, traffic lights, traffic signs, road signs, cones, a pedestrian, a bicycle, and a driver of the first vehicle 102A. The data for road objects is applied to train one or more vehicle models (e.g., the vehicle behavior model of the first vehicle 102A).

In some embodiments, the plurality of sensors 260 include (932) a camera 266, and the collected training data 248 includes a plurality of images captured by the camera 266. The one or more vehicles 102 include (934) a plurality of second vehicles (e.g. adjacent vehicles 102B-102D in FIG. 6) that are near the first vehicle 102A and correspond to a plurality of vehicle types. For example, a second vehicle is optionally driving in an immediately adjacent lane or in the same lane with the first vehicle 102A. The vehicle driving behavior model 252 is trained (936) using the plurality of images to predict behavior of the plurality of second vehicles based on the plurality of vehicle types. Such predicted behavior is determined based positions, speeds, or accelerations of the first and second vehicles. Examples of the predicted behavior includes how quickly a second vehicle changes lane, how a second vehicle responds to a red traffic light, and whether a second vehicle is aggressive or conservative. A vehicle type is automatically considered in the vehicle driving behavior model 252 to predict the behavior of the plurality of second vehicles.

In some embodiments, the collected training data 248 includes (938) a first set of training data 248A captured during a first duration of time $T_1$ and a second set of training data 248B captured during a second duration of time $T_2$ following the first duration of time $T_1$. The behavior of the one or more vehicles 102 is determined (940) from the first set of training data 248A using the vehicle driving behavior model 252 and compared (942) with the second set of training data 248B. Based on a comparison result, one or more weights of a neural network of the vehicle driving behavior model 252 are modified (944), e.g., to minimize a loss function or reduce the loss function below a loss threshold level.

In some embodiments, the vehicle driving behavior model 252 is trained (946), before the sensor data 254 are collected from the plurality of sensors 260 and the vehicle driving behavior model 252 is used to predict the vehicle behavior 606. The sensor data 254 are added (948) to the training data 248 to iteratively train the vehicle driving behavior model 252, after applying the vehicle driving behavior model 252 to predict the vehicle behavior 606.

In some embodiments, the vehicle driving behavior model 252 includes (950) a first vehicle driving behavior model 252A, and the first vehicle driving behavior model 252A is trained using the collected training data 248 to generate a second vehicle driving behavior model 252B, concurrently when the first vehicle driving behavior model 252A is used to predict the vehicle behavior from the collected sensor data. The first vehicle 102A adds (952) the collected sensor data 254 to the collected training data 248. Further, in some embodiments, the collected sensor data includes (954) first sensor data 254A. The first vehicle 102A collects (956) second sensor data 254B from the plurality of sensors 260 after collecting the first sensor data 254A. While continuing to train the second vehicle driving behavior model 252B with the training data 248 added with the first sensor data 254A, the first vehicle 102A applies (958) the second vehicle driving behavior model 252B to predict the vehicle behavior 606 based on the second sensor data 254B.

In some embodiments, the vehicle driving behavior model 252 is applied (960) to control driving of the first vehicle 102A itself. A vehicle control model is used together with the vehicle driving behavior model 252 to drive the first vehicle 102A at least partially autonomously. In accordance with a determination (962) that the first vehicle 102A operates in an at least partial autonomous driving mode, the first vehicle 102A provides (964) the predicted vehicle behavior to the vehicle control model. Based on the predicted vehicle behavior, the first vehicle 102A applies (966) the vehicle control model to generate a vehicle control instruction for controlling the first vehicle 102A.

In some embodiments, the vehicle driving behavior model 252 is provided (968) to a server 104 for further processing. Specifically, the first vehicle 102A provides the vehicle driving behavior model 252 that is trained using the collected training data 248 to the server 104. The server 104 is communicatively coupled to the first vehicle 102A via one or more communication networks 110. Further, in some embodiments, the server 104 is configured to consolidate (970) a plurality of driving behavior models provided by a plurality of vehicles 102, generate a comprehensive driving behavior model, and provide the comprehensive driving behavior model to one or more target vehicles 102. Optionally, the plurality of vehicles 192 includes the first vehicle 102A, and the plurality of driving behavior models includes the vehicle driving behavior model 252 provided by the first vehicle 102A. Optionally, the plurality of vehicles does not include the first vehicle 102A. In some embodiments, the one or more target vehicles include the first vehicle 102A. Alternatively, in some embodiments, the one or more target vehicles do not include the first vehicle 102A, and the server 104 is configured to provide the vehicle driving behavior model 252 provided by the first vehicle 102A to one or more target vehicles distinct from the first vehicle 102A. If a target vehicle has no local copy of the vehicle driving behavior model 252, the comprehensive driving behavior model is applied to predict vehicle behavior of the target vehicle or associated adjacent vehicles. Conversely, if a target vehicle has a local copy of the vehicle driving behavior model 252, the comprehensive driving behavior model updates the local copy, e.g., as a next version.

In some embodiments, the vehicle driving behavior model 252 is provided to an alternative vehicle. The alternative vehicle is communicatively coupled to the first vehicle 102A via a wired or wireless link and configured to be driven, e.g., at least partially autonomously, by applying the vehicle driving behavior model 252 to predict associated vehicle behavior.

In some embodiments, the vehicle driving behavior model 252 is utilized by the first vehicle 102A locally to adjust the first vehicle 102A itself. The first vehicle 102A has (972) a plurality of vehicle parameters, and each of the plurality of sensors 260 and the vehicle control system 290 operates according to a respective vehicle parameter. The vehicle driving behavior model 252 is coupled (974) to a vehicle adjustment module of the first vehicle 102A that is configured to determine the plurality of vehicle parameters based on the predicted vehicle behavior. Specifically, the vehicle adjustment module obtains (976) the predicted vehicle behavior and update (978) the plurality of vehicle parameters based on the predicted vehicle behavior. The first vehicle 102A generates (980) a vehicle adjustment instruction based on the plurality of vehicle parameters that are updated.

Further, in some situations, one of the plurality of sensors 260 (e.g., LiDAR 264, INS 276) has a first sensitivity 806, and the plurality of vehicle parameters include the first sensitivity 806 of the one of the plurality of sensors 260. In response to the vehicle adjustment instruction, the first vehicle 102A adjusts the first sensitivity 806 of the one of the plurality of sensors 260 in response to the predicted vehicle behavior 606. In some situations, a portion of the vehicle control system 290 (e.g., a braking control 294) has a vehicle control setting, and the plurality of vehicle parameters include the vehicle control setting 808 of the portion of the vehicle control system 290. In response to the vehicle adjustment instruction, the first vehicle 102A adjusts the vehicle control setting 808 of the portion of the vehicle control system 290 in response to the predicted vehicle behavior 606.

Additionally, in some embodiments of this application, the first vehicle 102A takes advantages of offline scenario simulation, on-vehicle behavior learning, or life-long on-vehicle learning. A large number of driving scenarios are simulated offline for the first vehicle 102A to ensure that the first vehicle 102A operates reliably in a partially or entirely autonomous driving mode. The first vehicle 102A is trained to interact properly with other vehicles 102 with a wide range of different driving styles (e.g., from aggressive to conservative). It is difficult, if not impossible, to write rules to describe or predict the wide range of driving styles in the real world. Offline scenario simulation utilizes machine learning to incorporate the wide range of driving styles into a vehicle driving behavior model 252. Sensor data 254 collected by the first vehicle 102A reflects how the first vehicle 102A and surrounding vehicle react to each other in traffic, and can be conveniently applied to train the vehicle driving behavior model 252. For example, the vehicle driving behavior model 252 uses surrounding vehicle states (e.g., distance, speed, acceleration) of a first time instant as inputs and use states of the first vehicle 102A of a second time instant as labels (i.e., ground truth). After the vehicle driving behavior model 252 is trained on vehicle, the vehicle driving behavior model 252 could automatically predict vehicle trajectories for different environments, particularly in one or more road conditions that the first vehicle 102A operates most frequently.

Further, life-long on-vehicle learning is used for the first vehicle 102A to enable the vehicle driving behavior model 252 to be tuned progressively and constantly, e.g., without a need to be retrained from scratch. The first vehicle 102A may start from, and not be limited to, classical machine learning focused on a fixed dataset. Training data 248 is expanded to the sensor data 254 collected in real time from the plurality of sensors 260 and control data 258 received from the vehicle control system 290. The vehicle driving behavior model 252 benefits from training using this large amount of data. The vehicle driving behavior model 252 is optionally shared to a server 194 by the first vehicle 102A. By these means, only a small amount of data (i.e., the vehicle driving behavior model 252) is transferred out of individual vehicles 102, and original vehicle data 112 can be kept locally in individual vehicles without using a limited communication bandwidth or breaching data privacy of each individual vehicle.

It should be understood that the particular order in which the operations in FIGS. 9A-9D have been described are merely exemplary and are not intended to indicate that the described order is the only order in which the operations could be performed. One of ordinary skill in the art would recognize various ways to perform on-vehicle behavior modeling of vehicles as described herein. Additionally, it should be noted that details described above with respect to FIGS. 1-8 are also applicable in an analogous manner to the method 900 described above with respect to FIGS. 9A-9D. For brevity, these details are not repeated here.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., according to a communication protocol). In this manner, computer-readable media generally may correspond to (1) tangible computer-readable storage media which is non-transitory or (2) a communication medium, such as a signal or carrier wave. Data storage media may be any available media that can be accessed by one or more computers or one or more processors to retrieve instructions, code and/or data structures for implementation of the embodiments described in the present application. A computer program product may include a computer-readable medium.

The terminology used in the description of the embodiments herein is for the purpose of describing particular embodiments only and is not intended to limit the scope of claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first and second may be used herein to describe various elements, these elements should not be limited by these terms. These terms are only used to distinguish one element from another. For example, a first electrode could be termed a second electrode, and, similarly, a second electrode could be termed a first electrode, without departing from the scope of the embodiments. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative embodiments will be apparent to those of ordinary skill in the art having the benefit of the teachings presented in the foregoing descriptions and the associated drawings. The embodiments are described in order to best explain the principles of the invention, the practical application, and to enable others skilled in the art to understand the invention for various embodiments and to best utilize the underlying principles and various embodiments with various modifications as are suited to the particular use contemplated. Therefore, the scope of the claims is not to be limited to the specific examples of the embodiments disclosed. Modifications and other embodiments are intended to be included within the scope of the appended claims.

What is claimed is:

1. A method for on-vehicle behavior modeling of vehicles, comprising:
   at a first vehicle having one or more processors, memory, a plurality of sensors, and a vehicle control system:
      collecting training data via the plurality of sensors, the training data including data for one or more vehicles during a collection period;
      locally at the first vehicle, using machine learning to train a vehicle driving behavior model using the collected training data while the first vehicle is charging or parked, wherein the vehicle driving behavior model is configured to predict a behavior of the one or more vehicles, and wherein computing resources otherwise used to at least partially autonomously drive the first vehicle are used to train the vehicle driving behavior model while the first vehicle is charging or parked;
      subsequently collecting sensor data from the plurality of sensors; and
      at least partially autonomously driving the vehicle using the computing resources, including applying the vehicle driving behavior model to predict vehicle behavior based on the collected sensor data.

2. The method of claim 1, wherein:
   the one or more vehicles include the first vehicle, and the collected training data includes data for the first vehicle;

the vehicle driving behavior model is configured to predict behavior of the first vehicle; and the method comprises applying the vehicle driving behavior model to the collected sensor data to predict vehicle behavior of the first vehicle.

3. The method of claim 1, wherein:

the one or more vehicles include a plurality of second vehicles that are near the first vehicle, and the collected training data includes data for the plurality of second vehicles;

the vehicle driving behavior model is configured to predict behavior of a third vehicle that appears near the first vehicle; and the method comprises applying the vehicle driving behavior model to the collected sensor data to predict vehicle behavior of the third vehicle.

4. The method of claim 1, wherein:

the plurality of sensors include a camera, and the collected training data includes a plurality of images captured by the camera;

the one or more vehicles include a plurality of second vehicles that are near the first vehicle and correspond to a plurality of vehicle types; and the vehicle driving behavior model is trained using the plurality of images to predict behavior of the plurality of second vehicles based on the plurality of vehicle types.

5. The method of claim 1, wherein the collected training data includes a first set of training data captured during a first duration of time and a second set of training data captured during a second duration of time following the first duration of time, and using machine learning to train the vehicle driving behavior model further includes:

determining the behavior of the one or more vehicles from the first set of training data using the vehicle driving behavior model;

comparing the behavior of the one or more vehicles with the second set of training data; and modifying one or more weights of a neural network of the vehicle driving behavior model based on a comparison result.

6. The method of claim 1, wherein:

the one or more vehicles include one or more second vehicles near the first vehicle during the collection period;

the plurality of sensors includes at least a light detection and ranging (LiDAR) scanner and an inertial navigation system (INS) including accelerometers and gyroscopes; and the training data includes relative positions that are measured between the first vehicle and the one or more second vehicles by the LiDAR scanner and relative motions measured between the first vehicle and the one or more second vehicles by the INS during the collection period.

7. The method of claim 1, wherein the vehicle driving behavior model is trained using unused on-vehicle processing capabilities of the first vehicle.

8. The method of claim 1, wherein the vehicle driving behavior model includes a first vehicle driving behavior model, and the first vehicle driving behavior model is trained using the collected training data to generate a second vehicle driving behavior model, concurrently when the first vehicle driving behavior model is used to predict the vehicle behavior from the collected sensor data, the method further comprising:

adding the collected sensor data to the collected training data.

9. The method of claim 8, the collected sensor data including first sensor data, the method further comprising:

collecting second sensor data from the plurality of sensors after collecting the first sensor data; and while continuing to train the second vehicle driving behavior model with the training data added with the first sensor data, applying the second vehicle driving behavior model to predict the vehicle behavior based on the second sensor data.

10. The method of claim 1, wherein a vehicle control model is used together with the vehicle driving behavior model to at least partially autonomously drive the vehicle.

11. The method of claim 10, further comprising, in accordance with a determination that the first vehicle operates in an at least partial autonomous driving mode:

providing the predicted vehicle behavior to the vehicle control model; and based on the predicted vehicle behavior, applying the vehicle control model to generate a vehicle control instruction for controlling the first vehicle.

12. A vehicle, comprising:

a plurality of sensors;

a vehicle control system;

one or more processors; and memory storing one or more programs configured for execution by the one or more processors, the one or more programs comprising instructions for:

collecting training data via the plurality of sensors, the training data including data for one or more vehicles during a collection period;

locally at the vehicle, using machine learning to train a vehicle driving behavior model using the collected training data while the vehicle is charging or parked, wherein the vehicle driving behavior model is configured to predict a behavior of the one or more vehicles, and wherein computing resources otherwise used to at least partially autonomously drive the vehicle are used to train the vehicle driving behavior model while the vehicle is charging or parked;

subsequently collecting sensor data from the plurality of sensors; and at least partially autonomously driving the vehicle using the computing resources, including applying the vehicle driving behavior model to predict vehicle behavior based on the collected sensor data.

13. The vehicle of claim 12, wherein:

the vehicle driving behavior model is trained, before the sensor data are collected from the plurality of sensors and the vehicle driving behavior model is used to predict the vehicle behavior; and the sensor data are added to the training data to iteratively train the vehicle driving behavior model, after applying the vehicle driving behavior model to predict the vehicle behavior.

14. The vehicle of claim 12, wherein:

the vehicle has a plurality of vehicle parameters, and each of the plurality of sensors operates according to a respective vehicle parameter; and the vehicle driving behavior model is coupled to a vehicle adjustment module that is configured to determine a subset of the plurality of vehicle parameters for controlling operation of the plurality of sensors.

15. The vehicle of claim 14, the one or more programs further comprising instructions for:

providing the predicted vehicle behavior to the vehicle adjustment module; and updating by the vehicle adjustment module the plurality of vehicle parameters based on the predicted vehicle behavior; and generating a vehicle adjustment instruction based on the plurality of vehicle parameters that are updated.

16. The vehicle of claim 12, wherein the plurality of sensors include one or more of: a global positioning system (GPS), a light detection and ranging (LiDAR) scanner, one or more cameras, a radio detection and ranging (RADAR) sensor, an infrared sensor, one or more ultrasonic sensors, a dedicated short-range communication (DSRC) module, an inertial navigation system (INS) including accelerometers and gyroscopes, and an odometry sensor.

17. A non-transitory computer-readable storage medium storing one or more programs configured for execution by one or more processors of a first vehicle, the first vehicle further including a plurality of sensors and a vehicle control system, the one or more programs comprising instructions for:

collecting training data via the plurality of sensors, the training data including data for one or more vehicles during a collection period;

locally at the first vehicle, using machine learning to train a vehicle driving behavior model using the collected training data while the first vehicle is charging or parked, wherein the vehicle driving behavior model is configured to predict a behavior of the one or more vehicles, and wherein computing resources otherwise used to at least partially autonomously drive the first vehicle are used to train the first vehicle driving behavior model while the vehicle is charging or parked;

subsequently collecting sensor data from the plurality of sensors; and at least partially autonomously driving the first vehicle using the computing resource, including applying the vehicle driving behavior model to predict vehicle behavior based on the collected sensor data.

18. The non-transitory computer-readable storage medium of claim 17, the one or more programs further comprising instructions for:

providing the vehicle driving behavior model that is trained using the collected training data to a server, wherein the server is communicatively coupled to the first vehicle via one or more communication networks.

19. The non-transitory computer-readable storage medium of claim 18, wherein the server is configured to consolidate a plurality of driving behavior models provided by a plurality of vehicles, generate a comprehensive driving behavior model, and provide the comprehensive driving behavior model to one or more target vehicles.

20. The non-transitory computer-readable storage medium of claim 17, the one or more programs further comprising instructions for:

collecting data for road objects that appear on a road and in measurement ranges of the plurality of sensors, the road objects including one or more of: lane lines, shoulder lines, road dividers, traffic lights, traffic signs, road signs, cones, a pedestrian, a bicycle, and a driver of the first vehicle, wherein the data for road objects is applied to train one or more vehicle models.

* * * * *